US011257489B2

(12) United States Patent
Sakaguchi et al.

(10) Patent No.: US 11,257,489 B2
(45) Date of Patent: Feb. 22, 2022

(54) PORTABLE TERMINAL, MANAGEMENT SERVER, WORK HANDOVER SUPPORT SYSTEM, WORK HANDOVER SUPPORT METHOD, AND PROGRAM

(71) Applicant: NEC Corporation, Tokyo (JP)

(72) Inventors: Motohiko Sakaguchi, Tokyo (JP); Masahiro Tabuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 436 days.

(21) Appl. No.: 16/080,712

(22) PCT Filed: Aug. 3, 2017

(86) PCT No.: PCT/JP2017/028186
§ 371 (c)(1),
(2) Date: Aug. 29, 2018

(87) PCT Pub. No.: WO2018/025952
PCT Pub. Date: Feb. 8, 2018

(65) Prior Publication Data
US 2021/0193134 A1 Jun. 24, 2021

(30) Foreign Application Priority Data
Aug. 4, 2016 (JP) .............................. JP2016-153947

(51) Int. Cl.
*G10L 15/22* (2006.01)
*G06Q 10/06* (2012.01)
*G10L 15/08* (2006.01)

(52) U.S. Cl.
CPC ...... *G10L 15/22* (2013.01); *G06Q 10/063118* (2013.01); *G10L 15/083* (2013.01)

(58) Field of Classification Search
CPC ......... G10L 15/22; G10L 15/00; G10L 15/01; G10L 15/08; G10L 15/183; G10L 15/20;
(Continued)

(56) References Cited

U.S. PATENT DOCUMENTS

2007/0036117 A1* 2/2007 Taube ................... H04W 4/029
370/338
2010/0198596 A1* 8/2010 Bhardwaj ........... G06F 16/3331
704/235
(Continued)

FOREIGN PATENT DOCUMENTS

CN 104205038 A 12/2014
JP 2002-023836 A 1/2002
(Continued)

OTHER PUBLICATIONS

Chinese Office Action for JP Application No. 201780016733.6 dated Sep. 29, 2020 with English Translation.
(Continued)

*Primary Examiner* — Qi Han
(74) *Attorney, Agent, or Firm* — Sughrue Mion, PLLC

(57) ABSTRACT

A portable terminal includes: a storage part which holds work information in which a plurality of items included in work are associated with respective work results; a speech recognition part which stores a work result(s) obtained by recognizing an utterance(s) of a worker in the storage part; and a communication part which transmits, when the speech recognition part recognizes a predetermined utterance(s) of a worker, a work result(s) held by the storage part to a management server or another (other) portable terminal(s). When the communication part receives a work result(s) from the management server or another (other) portable terminal(s), the communication part stores the received work result(s) in the storage part.

14 Claims, 16 Drawing Sheets

(58) Field of Classification Search
CPC ..... G10L 15/24; G10L 15/26; G10L 2015/22; G10L 2015/00; G10L 2015/06; G10L 2015/223; G10L 2015/225; G10L 2015/227; G10L 2015/0631–0638; G10L 2015/221–228
USPC .... 704/270, 270.1, 275, 276, 251, 235, 236, 704/246, 250
See application file for complete search history.

(56) References Cited

U.S. PATENT DOCUMENTS

| | | |
|---|---|---|
| 2015/0082175 A1 | 3/2015 | Onohara et al. |
| 2016/0132815 A1* | 5/2016 | Itoko .................. G06Q 50/01 705/7.42 |

FOREIGN PATENT DOCUMENTS

| | | |
|---|---|---|
| JP | 2003-140735 A | 5/2003 |
| JP | 2004-096542 A | 3/2004 |
| JP | 2005-107758 A | 4/2005 |
| JP | 2006-336155 A | 12/2006 |
| JP | 2008-192019 A | 8/2008 |
| JP | 2009-032206 A | 2/2009 |
| JP | 2011-028324 A | 2/2011 |
| JP | 2014-059838 A | 4/2014 |

OTHER PUBLICATIONS

Japanese Office Action for JP Application No. 2016-153947 dated Jun. 30, 2020 with English Translation.
International Search Report for PCT Application No. PCT/JP2017/028186, dated Oct. 17, 2017.
Japanese Office Action for JP Application No. 2016-153947 dated Apr. 21, 2020 with English Translation.

* cited by examiner

FIG. 5

WORKSHEET Dn (n = 1 to N)

| WORK ITEMS | WORK CONTENTS (TO BE READ OUT) | WORK RESULTS | WORKER IDs | TERMINAL IDs |
|---|---|---|---|---|
| MODEL NUMBER OF APPARATUS | CHECK THE MODEL NUMBER OF THE APPARATUS | | | |
| ATTACHMENT OF SCREWS ON UPPER SURFACE OF APPARATUS | ATTACH SCREWS AT FOUR PLACES ON THE UPPER SURFACE OF THE APPARATUS | | | |
| CHECK FOR LOOSE SCREWS ON APPARATUS | CHECK FOR LOOSE SCREWS AT EIGHT PLACES ON THE APPARATUS | | | |
| CHECK FOR ABNORMALITY ON APPEARANCE OF APPARATUS | CHECK FOR ABNORMALITY ON THE APPEARANCE OF THE APPARATUS | | | |

FIG. 6a

| TERMINAL ID | HANDOVER SOURCE INFORMATION |
|---|---|
| | HANDOVER SOURCE TERMINAL ID |
| 2A | — |

FIG. 6b

| TERMINAL ID | HANDOVER SOURCE INFORMATION |
|---|---|
| | HANDOVER SOURCE TERMINAL ID |
| 2B | 2A |

FIG. 6c

| TERMINAL ID | HANDOVER SOURCE INFORMATION |
|---|---|
| | HANDOVER SOURCE TERMINAL ID |
| 2C | 2B |

FIG. 7a

WORKSHEET Dn (n = 1 to N)

| WORK ITEMS | WORK CONTENTS (TO BE READ OUT) | WORK RESULTS | WORKER IDs | TERMINAL IDs |
|---|---|---|---|---|
| MODEL NUMBER OF APPARATUS | CHECK THE MODEL NUMBER OF THE APPARATUS | ABC1 | 100A | 2A |
| ATTACHMENT OF SCREWS ON UPPER SURFACE OF APPARATUS | ATTACH SCREWS AT FOUR PLACES ON THE UPPER SURFACE OF THE APPARATUS | ATTACHED | 100A | 2A |
| CHECK FOR LOOSE SCREWS ON APPARATUS | CHECK FOR LOOSE SCREWS AT EIGHT PLACES ON THE APPARATUS | | | |
| CHECK FOR ABNORMALITY ON APPEARANCE OF APPARATUS | CHECK FOR ABNORMALITY ON THE APPEARANCE OF THE APPARATUS | | | |

FIG. 7b

WORKSHEET Dn (n = 1 to N)

| WORK ITEMS | WORK CONTENTS (TO BE READ OUT) | WORK RESULTS | WORKER IDs | TERMINAL IDs |
|---|---|---|---|---|
| MODEL NUMBER OF APPARATUS | CHECK THE MODEL NUMBER OF THE APPARATUS | ABC1 | 100A | 2A |
| ATTACHMENT OF SCREWS ON UPPER SURFACE OF APPARATUS | ATTACH SCREWS AT FOUR PLACES ON THE UPPER SURFACE OF THE APPARATUS | ATTACHED | 100A | 2A |
| CHECK FOR LOOSE SCREWS ON APPARATUS | CHECK FOR LOOSE SCREWS AT EIGHT PLACES ON THE APPARATUS | CHECKED | 100B | 2B |
| CHECK FOR ABNORMALITY ON APPEARANCE OF APPARATUS | CHECK FOR ABNORMALITY ON THE APPEARANCE OF THE APPARATUS | | | |

FIG. 7c

WORKSHEET Dn (n = 1 to N)

| WORK ITEMS | WORK CONTENTS (TO BE READ OUT) | WORK RESULTS | WORKER IDs | TERMINAL IDs |
|---|---|---|---|---|
| MODEL NUMBER OF APPARATUS | CHECK THE MODEL NUMBER OF THE APPARATUS | ABC1 | 100A | 2A |
| ATTACHMENT OF SCREWS ON UPPER SURFACE OF APPARATUS | ATTACH SCREWS AT FOUR PLACES ON THE UPPER SURFACE OF THE APPARATUS | ATTACHED | 100A | 2A |
| CHECK FOR LOOSE SCREWS ON APPARATUS | CHECK FOR LOOSE SCREWS AT EIGHT PLACES ON THE APPARATUS | CHECKED | 100B | 2B |
| CHECK FOR ABNORMALITY ON APPEARANCE OF APPARATUS | CHECK FOR ABNORMALITY ON THE APPEARANCE OF THE APPARATUS | CHECKED | 100C | 2C |

FIG. 9a  HANDOVER SOURCE INFORMATION

| TERMINAL ID | HANDOVER SOURCE TERMINAL ID |
|---|---|
| 2A | — |

FIG. 9b  HANDOVER SOURCE INFORMATION

| TERMINAL ID | HANDOVER SOURCE TERMINAL ID |
|---|---|
| 2B | 2A |

FIG. 9c  HANDOVER SOURCE INFORMATION

| TERMINAL ID | HANDOVER SOURCE TERMINAL ID |
|---|---|
| 2C | 2A, 2B |

FIG. 10a

WORKSHEET Dn (n = 1 to N)

| WORK ITEMS | WORK CONTENTS (TO BE READ OUT) | WORK RESULTS | WORKER IDs | TERMINAL IDs |
|---|---|---|---|---|
| MODEL NUMBER OF APPARATUS | CHECK THE MODEL NUMBER OF THE APPARATUS | ABC1 | 100A | 2A |
| ATTACHMENT OF SCREWS ON UPPER SURFACE OF APPARATUS | ATTACH SCREWS AT FOUR PLACES ON THE UPPER SURFACE OF THE APPARATUS | ATTACHED | 100A | 2A |
| CHECK FOR LOOSE SCREWS ON APPARATUS | CHECK FOR LOOSE SCREWS AT EIGHT PLACES ON THE APPARATUS | | | |
| CHECK FOR ABNORMALITY ON APPEARANCE OF APPARATUS | CHECK FOR ABNORMALITY ON THE APPEARANCE OF THE APPARATUS | | | |

FIG. 10b

WORKSHEET Dn (n = 1 to N)

| WORK ITEMS | WORK CONTENTS (TO BE READ OUT) | WORK RESULTS | WORKER IDs | TERMINAL IDs |
|---|---|---|---|---|
| MODEL NUMBER OF APPARATUS | CHECK THE MODEL NUMBER OF THE APPARATUS | ABC1 | 100A | 2A |
| ATTACHMENT OF SCREWS ON UPPER SURFACE OF APPARATUS | ATTACH SCREWS AT FOUR PLACES ON THE UPPER SURFACE OF THE APPARATUS | ATTACHED | 100A | 2A |
| CHECK FOR LOOSE SCREWS ON APPARATUS | CHECK FOR LOOSE SCREWS AT EIGHT PLACES ON THE APPARATUS | CHECKED | 100C | 2C |
| CHECK FOR ABNORMALITY ON APPEARANCE OF APPARATUS | CHECK FOR ABNORMALITY ON THE APPEARANCE OF THE APPARATUS | CHECKED | 100C | 2C |

PORTABLE TERMINAL, MANAGEMENT SERVER, WORK HANDOVER SUPPORT SYSTEM, WORK HANDOVER SUPPORT METHOD, AND PROGRAM

REFERENCE TO RELATED APPLICATION

The present invention is based upon and claims the benefit of the priority of Japanese patent application No. 2016-153947, filed on Aug. 4, 2016, the disclosure of which is incorporated herein in its entirety by reference thereto.

FIELD

The present invention relates to a portable terminal, a management server, a work handover support system, a work handover support method, and a program. In particular, it relates to a portable terminal, a management server, a work handover support system, a work handover support method, and a program that support the handover of work between or among workers.

BACKGROUND

In recent years, in production assembly or inspection work in production lines at factories or patrol inspection work at plant facilities, there has been realized a technique in which workers carry portable terminals (for example, smartphones) and give work instructions (speech guide) and input work results (speech input) in a hands-free manner by using speech recognition/synthetic speech. This technique can improve the efficiency, accuracy, safety, etc. of work at sites.

When work such as assembly work, inspection work, or patrol inspection work includes a plurality of work items (which will simply be referred to as "items"), there are cases in which a plurality of workers share the plurality of items. For example, when a large number of products are produced on a production line, a conveyor system is adopted. In this system, workers and machines are arranged according to the sequence of the manufacturing process, and the products are produced by continuously performing a series of work.

PTL 1 discloses a related technique. According to PTL 1, when work is halted or ended, a portable terminal writes progress information indicating a work progress status at that point to an integrated circuit (IC) tag of an apparatus. When the work is started, a portable terminal reads the progress information from the IC tag of the apparatus, and the portable terminal starts to output guide information from the work process based on the work progress status indicated by the progress information.

CITATION LIST

Patent Literature

PTL 1: Japanese Patent Kokai Publication No. JP2008-192019A

SUMMARY

Technical Problem

The disclosure of the above PTL is incorporated herein in its entirety by reference thereto. The following analysis has been made by the present inventors.

The above technique that uses work instructions (speech guide) and input (speech input) in a hands-free manner by using speech recognition/synthetic speech assumes that a single worker works on all the items included in work. Namely, the technique does not assume a case in which a worker halts work before completing all the items and hands over the remaining items to another worker.

However, when many items are included in work or when causing one worker to perform all the items is too much burden on this worker, it is desirable that a plurality of workers share work, as in the above conveyor system. In this case, to keep the advantageous effects (the efficiency, accuracy, safety, etc.) obtained by giving work instructions and inputting work results in a hands-free manner, it is desirable that the operation of handing over work be realized in a hands-free manner.

The technique disclosed in PTL 1 assumes a cell production system in which a single worker performs all the assembly work of an individual apparatus from start to finish. Namely, PTL 1 does not assume a case in which a plurality of workers share work as in the conveyor system. Namely, PTL 1 does not disclose handing over information about a halfway result of work between or among a plurality of portable terminals held by a plurality of workers.

Thus, there is a demand for a technique that enables handing over a halfway result of work including a plurality of items in a hands-free manner between or among a plurality of workers. It is an object of the present invention to provide a portable terminal, a management server, a work handover support system, a work handover support method, and a program that contribute to meeting the demand.

Solution to Problem

A portable terminal according to a first aspect of the present invention includes: a storage part which holds work information in which a plurality of items included in work are associated with respective work results; a speech recognition part which stores a work result(s) obtained by recognizing an utterance(s) of a worker in the storage part; and a communication part which transmits, when the speech recognition part recognizes a predetermined utterance(s) of a worker, a work result(s) held by the storage part to a management server or another (other) portable terminal(s); wherein, when the communication part receives a work result(s) from the management server or another (other) portable terminal(s), the communication part stores the received work result(s) in the storage part.

A management server according to a second aspect of the present invention includes: a storage part which holds work information in which a plurality of items included in work are associated with respective work results; and a communication part which stores, when the communication part receives a work result(s) transmitted from a portable terminal(s) based on an utterance(s) of a worker(s) holding the portable terminal(s), the received work result(s) in the storage part, and transmits, when the communication part receives a request(s) for a work result(s) from a portable terminal(s), a work result(s) held by the storage part to the requesting portable terminal(s).

A work handover support system according to a third aspect of the present invention includes a plurality of portable terminals each being the portable terminal described above. Alternatively, the work handover support system includes: a plurality of portable terminals each being the portable terminal described above; and the above management server.

A work handover support method according to a fourth aspect of the present invention includes steps of: storing work information in which a plurality of items included in work are associated with respective work results in a storage part; storing a work result(s) obtained by recognizing an utterance(s) of a worker in the storage part; transmitting, when a predetermined utterance(s) of a worker is recognized, a work result(s) held by the storage part to a management server or another (other) portable terminal(s); and storing, when a work result(s) is received from the management server or another (other) portable terminal(s), the received work result(s) in the storage part.

A work handover support method according to a fifth aspect of the present invention includes steps of: storing work information in which a plurality of items included in work are associated with respective work results in a storage part; storing, when a work result(s) transmitted from a portable terminal(s) based on an utterance(s) of a worker(s) holding the portable terminal(s) is received, the received work result(s) in the storage part; and transmitting, when a request(s) for a work result(s) is received from a portable terminal(s), a work result(s) held by the storage part to the requesting portable terminal(s).

A program according to a sixth aspect of the present invention causes a computer to perform processing for: storing work information in which a plurality of items included in work are associated with respective work results in a storage part; storing a work result(s) obtained by recognizing an utterance(s) of a worker in the storage part; transmitting, when a predetermined utterance(s) of a worker is recognized, a work result(s) held by the storage part to a management server or another (other) portable terminal(s); and storing, when a work result(s) is received from the management server or another (other) portable terminal(s), the received work result(s) in the storage part.

A program according to a seventh aspect of the present invention causes a computer to perform processing for: storing work information in which a plurality of items included in work are associated with respective work results in a storage part; storing, when a work result(s) transmitted from a portable terminal(s) based on an utterance(s) of a worker(s) holding the portable terminal(s) is received, the received work result(s) in the storage part; and transmitting, when a request(s) for a work result(s) is received from a portable terminal(s), a work result(s) held by the storage part to the requesting portable terminal(s).

An individual one of the above programs can be provided as a program product stored in a non-transitory computer-readable storage medium.

Advantageous Effects of Invention

With the portable terminal, the management server, the work handover support system, the work handover support method, and the program according to the present invention, a halfway result of work including a plurality of items can be handed over in a hands-free manner between or among a plurality of workers.

BRIEF DESCRIPTION OF DRAWINGS

FIG. 5 illustrates a configuration example of a worksheet in the work handover support system according to the first exemplary embodiment.

FIG. 6 illustrates examples of handover source information in operation example 1 in the work handover support system according to the first exemplary embodiment.

FIG. 7 illustrates configuration examples of worksheets in operation example 1 in the work handover support system according to the first exemplary embodiment.

FIG. 9 illustrates examples of handover source information in operation example 2 in the work handover support system according to the first exemplary embodiment.

FIG. 10 illustrates configuration examples of worksheets in operation example 2 in the work handover support system according to the first exemplary embodiment.

DESCRIPTION OF EMBODIMENTS

Figure 1:
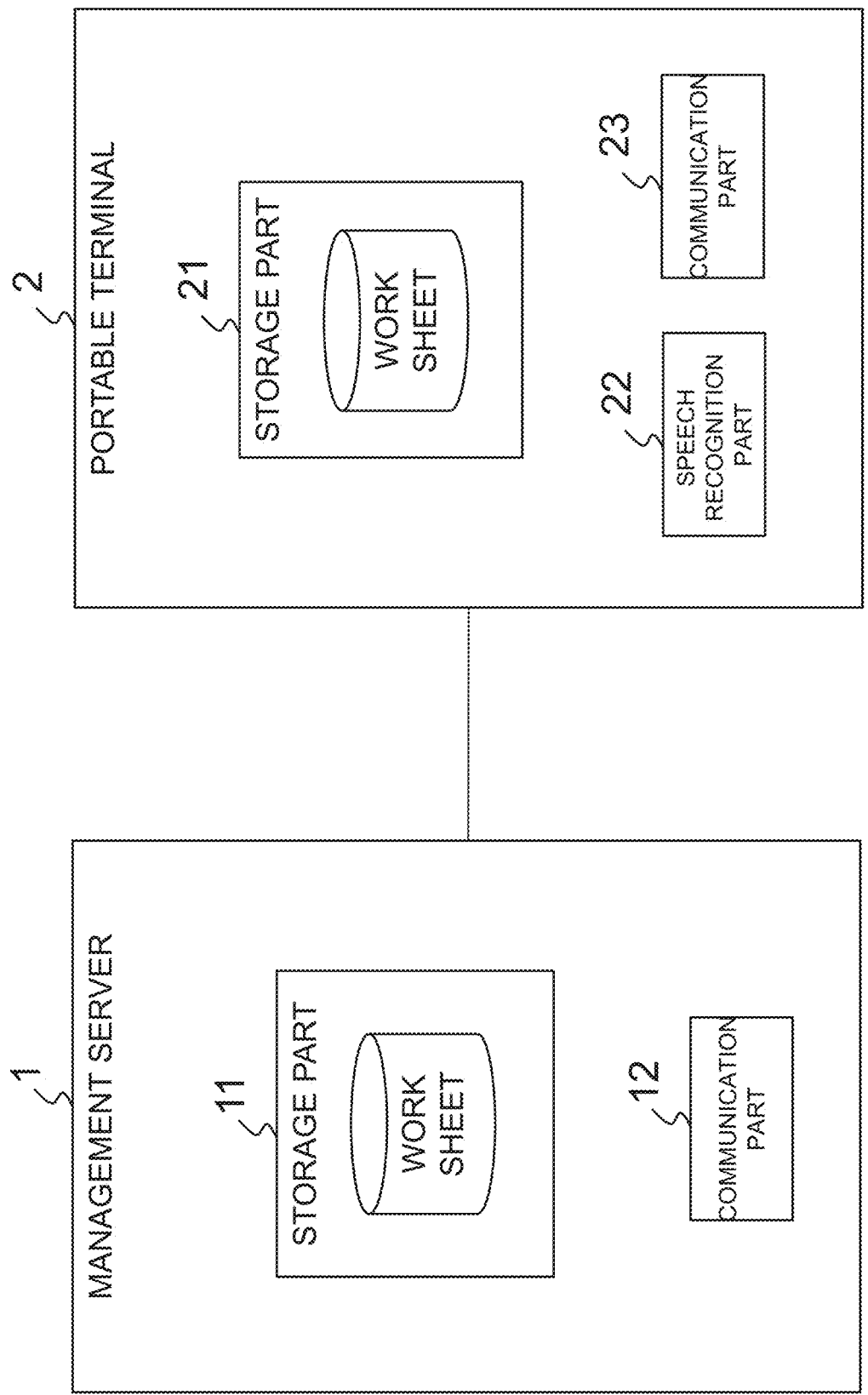
FIG. 1 is a block diagram illustrating a configuration example of a work handover support system according to an exemplary embodiment.

First, an outline of an exemplary embodiment will be described. Reference characters in the following outline are solely used as examples to facilitate understanding of the present invention, not to limit the present invention to the illustrated modes. For example, an individual connection line between blocks in any of the drawings to which the following description refers signifies both one-way and two-way directions. An individual arrow schematically illustrates the principal flow of a signal (data) and does not exclude bidirectionality.

Figure 2:
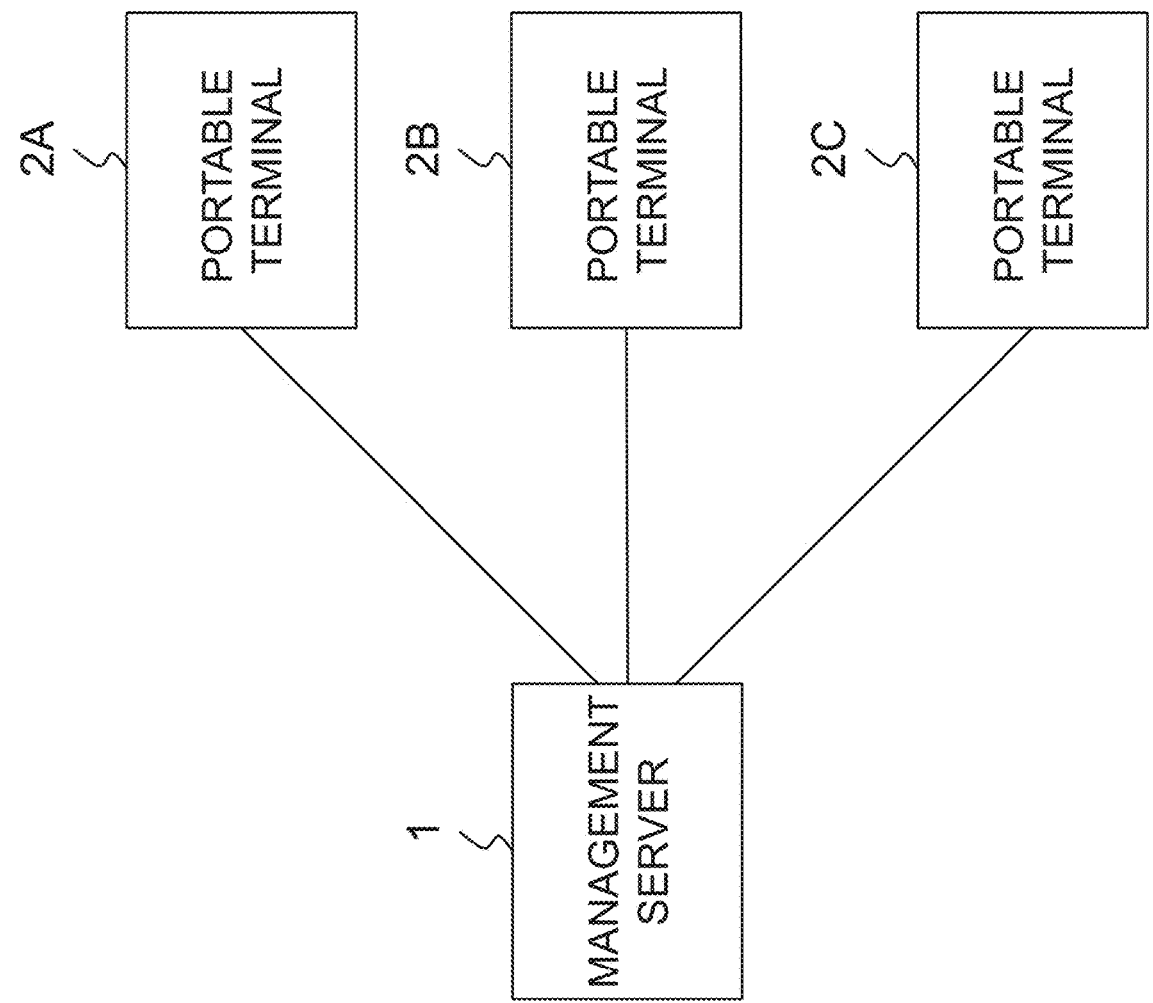
FIG. 2 illustrates a configuration example of a work handover support system according to a first exemplary embodiment.

FIG. 2 illustrates a configuration example of a work handover support system according to an exemplary embodiment. As illustrated in FIG. 2, the work handover support system includes a plurality of portable terminals 2A to 2C and a management server 1. FIG. 1 is a block diagram illustrating a specific configuration example of the work handover support system according to the exemplary embodiment. A portable terminal 2 in FIG. 1 represents the portable terminals 2A to 2C in FIG. 2.

The portable terminal 2 includes a storage part 21, a speech recognition part 22, and a communication part 23. The storage part 21 holds work information in which a plurality of items (work items) included in work are associated with respective work results. The communication part 23 stores a work result(s) received from the management server 1 in the storage part 21. The speech recognition part 22 stores a work result(s) obtained by recognizing an utterance(s) of a worker in the storage part 21. In addition, when the speech recognition part 22 recognizes a predetermined utterance(s) of a worker, the communication part 23 transmits a work result(s) held by the storage part 21 to the management server 1.

The management server 1 includes a storage part 11 and a communication part 12. The storage part 11 holds work information in which a plurality of items included in work are associated with respective work results. When the communication part 12 receives a work result(s) transmitted from a portable terminal(s) based on an utterance(s) of a worker(s) holding the portable terminal(s), the communication part 12 stores the received work result(s) in the storage part 11. In addition, when the communication part 12 receives a request(s) for a work result(s) from a portable terminal(s), the communication part 12 transmits a work result(s) held by the storage part 11 to the requesting portable terminal(s) 2.

Figure 3:
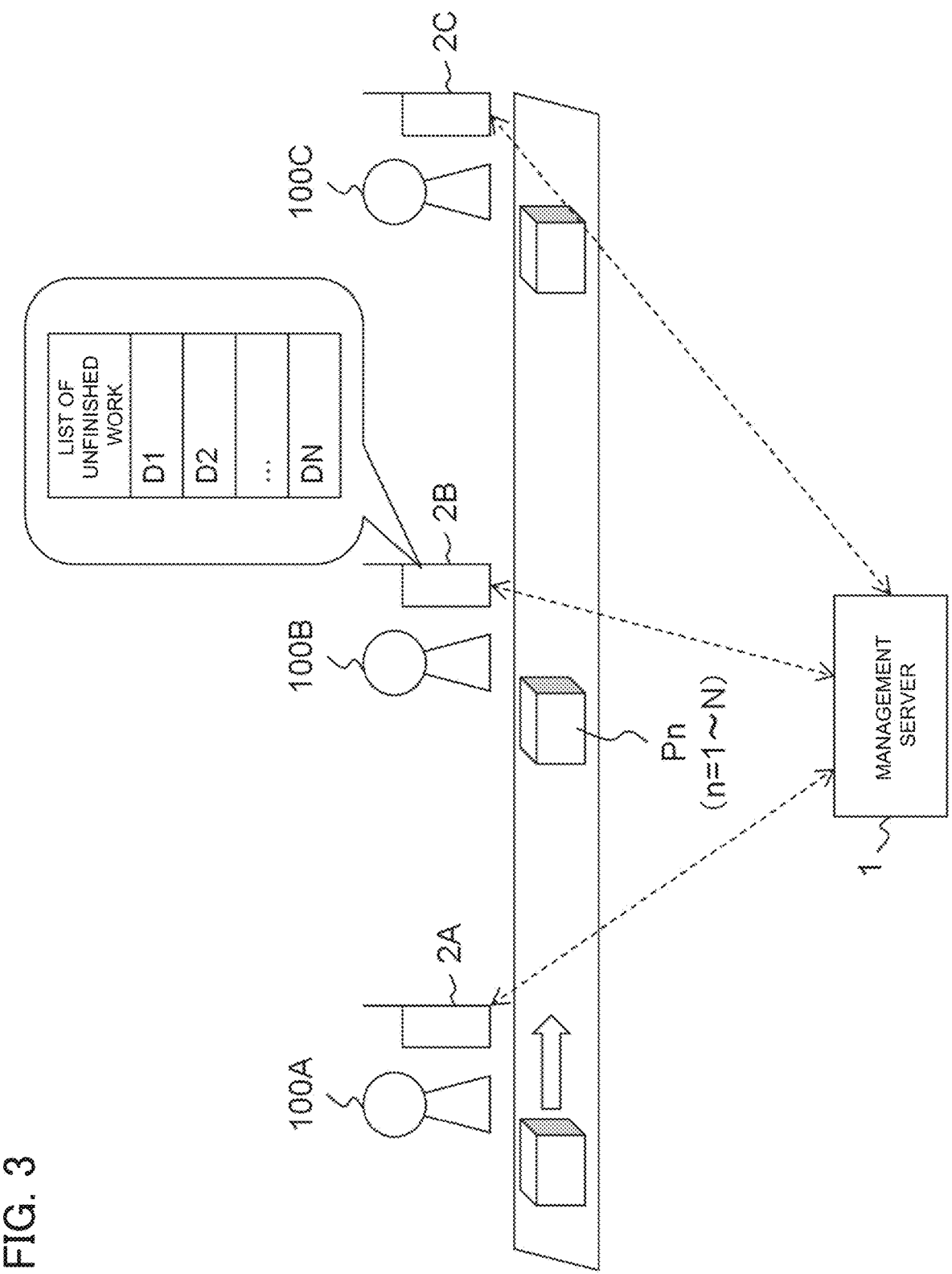
FIG. 3 is a diagram for describing the work handover support system according to the first exemplary embodiment.

In the work handover support system according to the exemplary embodiment, for example, as illustrated in FIG. 3, when workers 100A to 100C hold the portable terminals 2A to 2C, respectively, work is handed over as follows. The following description assumes that work about work objects Pn is handed over among the workers 100A to 100C. In addition, worksheets Dn (for example, FIG. 5) hold work information about the work objects Pn.

For example, each of the storage parts 21 of the portable terminals 2A to 2C held by the workers 100A to 100C holds the worksheets Dn (for example, FIG. 5). In each worksheet Dn, a plurality of items included in the work are associated with respective work results. The speech recognition part 22 of the portable terminal 2A held by the worker 100A stores work results obtained by recognizing utterances (for example, "ABC1" and "attached") of the worker 100A in a corresponding worksheet Dn held by the storage part 21 (for example, FIG. 7(a)). In addition, when the speech recognition part 22 recognizes a predetermined utterance (for example, "change") of the worker 100A, the communication part 23 of the portable terminal 2A held by the worker 100A transmits the work results included in the worksheet Dn (for example, FIG. 7(a)) held by the storage part 21 to the management server 1.

The storage part 11 of the management server 1 holds the worksheets Dn (for example, FIG. 5). In each worksheet Dn, the plurality of items included in the work are associated with the respective work results. When the communication part 12 of the management server 1 receives the work results transmitted from the portable terminal 2A based on the utterance of the worker 100A holding the portable terminal 2A, the communication part 12 stores the received work results in the corresponding worksheet Dn held by the storage part 11 (for example, FIG. 7(a)).

Next, when the speech recognition part 22 recognizes a predetermined utterance (for example, "reload") of the worker 100B, the communication part 23 of the portable terminal 2B held by the worker 100B requests the management server 1 to transmit a work result(s) and stores the work results (for example, the work results in FIG. 7(a)) received from the management server in the corresponding worksheet Dn in the storage part 21. The speech recognition part 22 of the portable terminal 2B held by the worker 100B stores a work result obtained by recognizing an utterance (for example, "checked") of the worker 100B in the corresponding worksheet Dn held by the storage part 21 (for example, FIG. 7(b)). In addition, when the speech recognition part 22 recognizes a predetermined utterance (for example, "change") of the worker 100B, the communication part 23 of the portable terminal 2B held by the worker 100B transmits the work results included in the corresponding worksheet Dn (for example, FIG. 7(b)) held by the storage part 21 to the management server 1.

Next, in the same way, the work results stored in the portable terminal 2B held by the worker 100B are handed over to the portable terminal 2C held by the worker 100C. In this way, according to the exemplary embodiment, a work result(s) corresponding to an item(s) on which a worker has finished is stored in the management server based on an utterance of the worker holding a portable terminal, and the work result(s) stored in the management server is handed over to a portable terminal held by another worker based on an utterance of the worker holding this another portable terminal. Thus, according to the exemplary embodiment, a halfway result of work including a plurality of items can be handed over in a hands-free manner between a plurality of workers.

Figure 14:
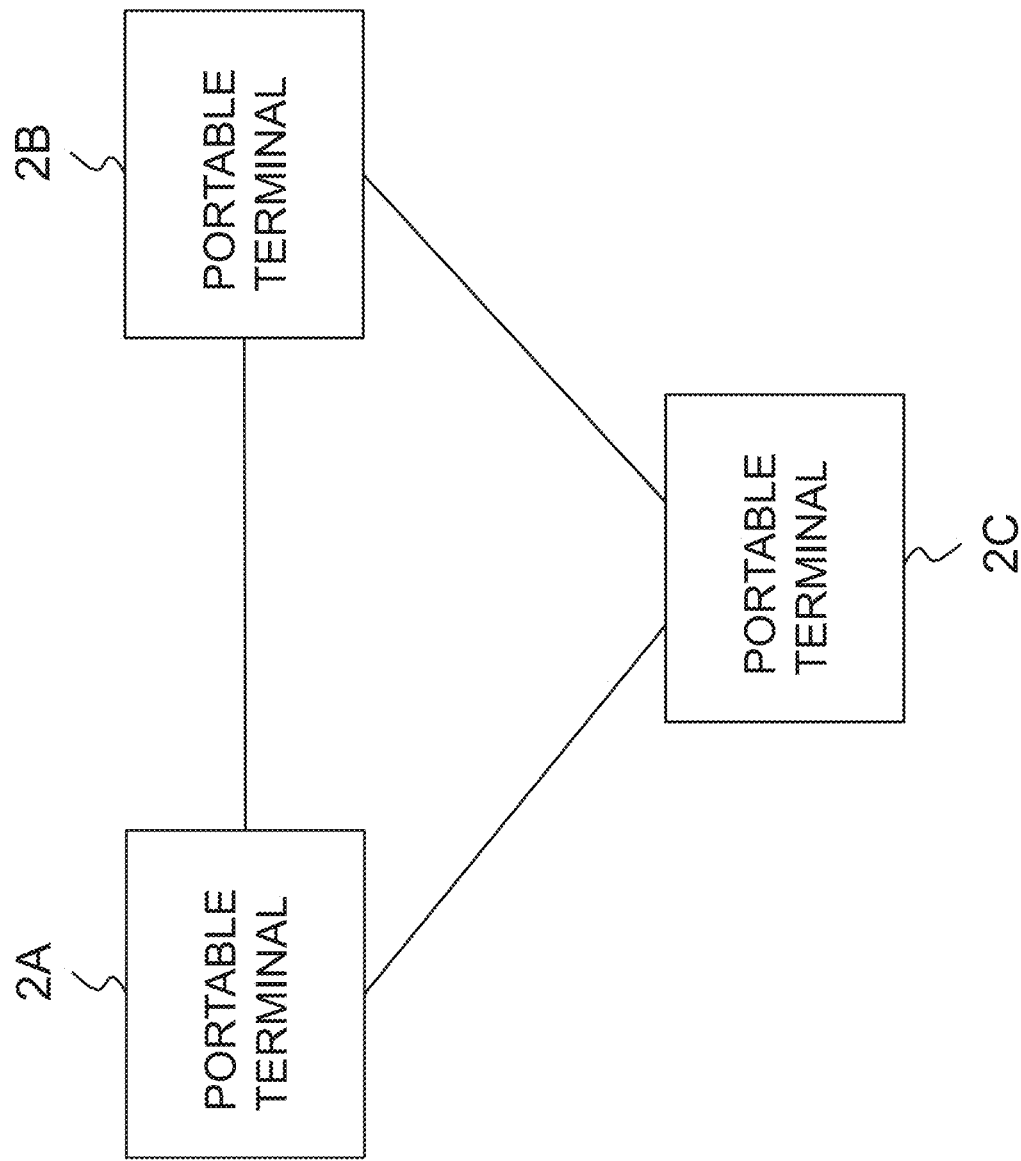
FIG. 14 illustrates a configuration example of a work handover support system according to a third exemplary embodiment.
Figure 15:
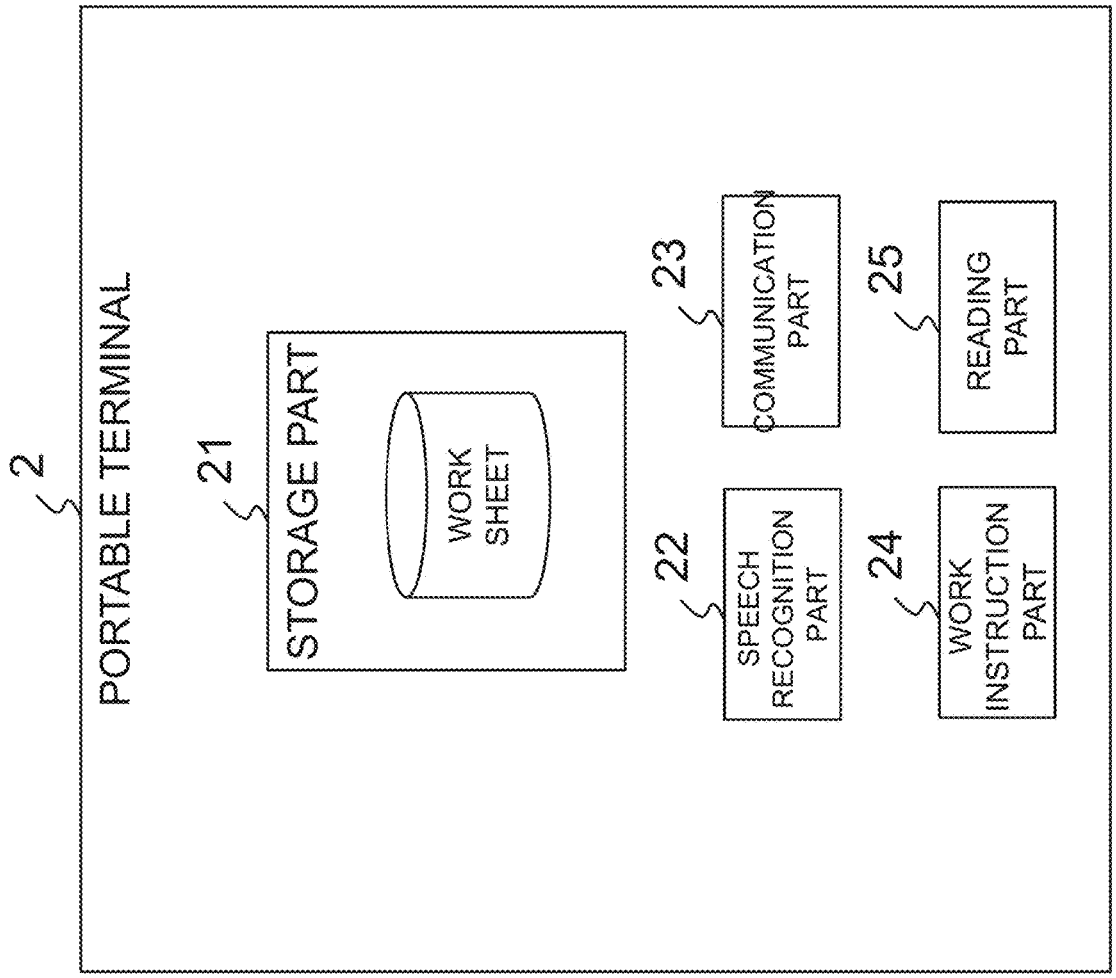
FIG. 15 is a block diagram illustrating a configuration example of a portable terminal in the work handover support system according to the third exemplary embodiment.

FIG. 14 illustrates another configuration example of the work handover support system according to the exemplary embodiment. As illustrated in FIG. 14, the work handover support system includes a plurality of portable terminals 2A to 2C. FIG. 15 is a block diagram illustrating a configuration example of the portable terminals 2A to 2C.

The portable terminal 2 includes a storage part 21, a speech recognition part 22, and a communication part 23. The storage part 21 holds work information in which a plurality of items included in work are associated with respective work results. The communication part 23 stores a work result(s) received from another portable terminal in the storage part 21. The speech recognition part 22 stores a work result(s) obtained by recognizing an utterance(s) of a worker in the storage part 21. In addition, when the speech recognition part 22 recognizes a predetermined utterance(s) of a worker, the communication part 23 transmits a work result(s) held by the storage part 21 to the other portable terminals.

With this configuration (FIG. 14) of the work handover support system according to the exemplary embodiment, for example, when the workers 100A to 100C hold the respective portable terminals 2A to 2C as illustrated in FIG. 3, work is handed over as follows. The following description assumes that the work about the work objects Pn is handed over among the workers 100A to 100C. In addition, the worksheets Dn (for example, FIG. 5) hold the work information about the work objects Pn.

For example, each of the storage parts 21 of the portable terminals 2A to 2C held by the respective workers 100A to 100C holds the worksheets Dn (for example, FIG. 5). In each worksheet Dn, the plurality of items included in the work are associated with the respective work results. The speech recognition part 22 of the portable terminal 2A held by the worker 100A stores work results obtained by recognizing utterances (for example, "ABC1" and "attached") of the worker 100A in a corresponding worksheet Dn held by the storage part 21 (for example, FIG. 7(a)). In addition, when the speech recognition part 22 recognizes a predetermined utterance (for example, "change") of the worker 100A, the communication part 23 of the portable terminal 2A held by the worker 100A transmits the work results included in the worksheet Dn (for example, FIG. 7(*a*)) held by the storage part 21 to the other portable terminals 2B and 2C.

The communication parts 23 of the portable terminals 2B and 2C store the work results received from the portable terminal 2A in their respective worksheets Dn held by their respective storage parts 21 (for example, FIG. 7(*a*)). Next, the speech recognition part 22 of the portable terminal 2B held by the worker 100B stores a work result obtained by recognizing an utterance (for example, "checked") of the worker 100B in the corresponding worksheet Dn held by the storage part (for example, see FIG. 7(*b*)). In addition, when the speech recognition part 22 recognizes a predetermined utterance (for example, "change") of the worker 100B, the communication part 23 of the portable terminal 2B held by the worker 100B transmits the work results included in the corresponding worksheet Dn (for example, FIG. 7(*b*)) held by the storage part 21 to the other portable terminals 2A and 2C.

A work result may include not only information obtained by the speech recognition performed by the speech recognition part 22 but also information inputted by a worker by operating input means (not illustrated) or information read by a reading part 25, which will be described below (for example, information about a machine manufacturing a component(s) of the work objects Pn or information about a manufacturer). In this way, it is possible to easily track what component has been used to manufacture a work object Pn based on the information included in the corresponding work result.

Next, in the same way, the work results held by the worker 100C are handed over to the portable terminals 2A and 2B held by the respective workers 100A and 100B. In this way, according to this configuration of the exemplary embodiment, based on an utterance of a worker holding a portable terminal, a work result(s) corresponding to an item(s) on which the worker has finished is handed over to the portable terminals held by the other workers. Thus, according to the exemplary embodiment, a halfway result of work including a plurality of items can be handed over in a hands-free manner among a plurality of workers.

Exemplary Embodiment 1

Next, a work handover support system according to a first exemplary embodiment will be described with reference to drawings.
[Configuration]
FIG. 2 illustrates a configuration example of a work handover support system according to the present exemplary embodiment. As illustrated in FIG. 2, the work handover support system includes a management server 1 and portable terminals 2A to 2C. The portable terminals 2A to 2C are connected wirelessly to the management server 1 (any of the connections may include a wired section).

As illustrated as an example in FIG. 3, the present exemplary embodiment assumes that three workers 100A to 100C share work items included in work for manufacturing work objects Pn (n=1 to N) while handing over the work items. In addition, the present exemplary embodiment assumes that the worker 100A works on the most upstream side and the downstream worker 100B or 100C takes over the work on which the worker 100A has left unfinished. In addition, the worker 100C takes over the work on which the worker 100A or 100B has left unfinished. As illustrated in FIG. 3, the workers 100A to 100C hold their respective portable terminals 2A to 2C. The number of workers and the number of portable terminals illustrated in FIGS. 2 and 3 are merely examples, and the present invention is not limited to the illustrated modes.

Figure 4:
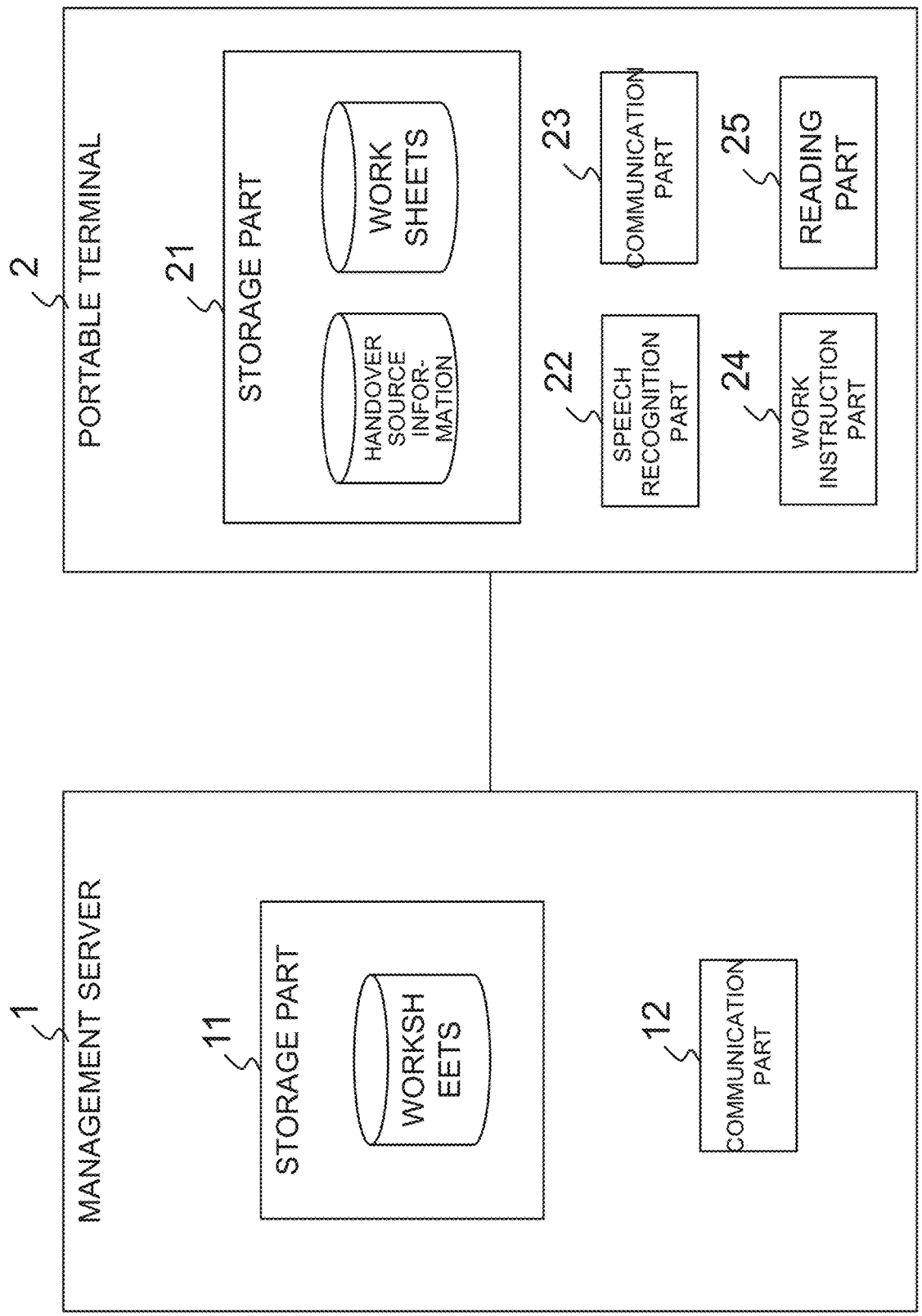
FIG. 4 is a block diagram illustrating a configuration example of the work handover support system according to the first exemplary embodiment.

FIG. 4 is a block diagram illustrating a specific configuration example of the work handover support system (FIG. 2) according to the present exemplary embodiment. A portable terminal 2 in FIG. 4 represents the portable terminals 2A to 2C in FIG. 2. Hereinafter, when the portable terminals 2A to 2C do not need to be distinguished from each other, an individual one of these portable terminals will collectively be referred to as a portable terminal 2.

As illustrated in FIG. 4, the management server 1 includes a storage part 11 and a communication part 12.

The storage part 11 holds worksheets Dn (n=1 to N). In each of these worksheets Dn, a plurality of items included in work are associated with respective work results. The worksheets Dn correspond to the work objects Pn (see FIG. 3) on a one-to-one basis. FIG. 5 illustrates a configuration example of an individual worksheet Dn. As illustrated in FIG. 5, the worksheet Dn includes columns "work items", "work contents (to be read out)", "work results", "worker IDs", and "terminal IDs". Under "work items", the work items corresponding to a work object Pn are listed. Under "work contents (to be read out)", the work contents to be read out by a portable terminal 2 when speech guide is performed on the respective work items are listed. Under "work results", the results obtained when a worker(s) has finished the respective work items are listed. Under "worker IDs", the worker IDs that identify the workers are listed. Under "terminal IDs", the terminal IDs that indicate the portable terminals that have transmitted the work results are listed. These items of information in an individual entry are associated with each other. Herein, for simplicity, the work for a work object Pn includes the following four work items: "the model number of the apparatus (acquisition)", "attachment of screws on the upper surface of the apparatus", "check for loose screws on the apparatus (check)", and "check for abnormality on the appearance of the apparatus (check)".

The communication part 12 transmits the worksheets Dn (n=1 to N) to the portable terminals 2A to 2C. In addition, when the communication part 12 receives a work result(s) transmitted from any one of the portable terminals 2A to 2C based on an utterance of a corresponding one of the workers 100A to 100C holding the portable terminals 2A to 2C, the communication part 12 stores the received work result(s) in a corresponding worksheet Dn held by the storage part 11. In addition, when the communication part 12 receives a request(s) for a work result(s) from a portable terminal(s), the communication part 12 transmits a work result(s) included in a corresponding worksheet Dn held by the storage part 11 to the requesting portable terminal(s).

When the communication part 12 receives a request for a work result(s) from a portable terminal (for example, the portable terminal 2B) and handover source information that identifies a handover source portable terminal or worker (for example, handover source information that identifies the portable terminal 2A), the communication part 12 transmits the work result(s) received from the portable terminal indicated by the received handover source information or from the portable terminal held by the worker indicated by the received handover source information (for example, the portable terminal 2A) to the requesting portable terminal (for example, the portable terminal 2B).

In addition, when the communication part 12 receives a request for a work result(s) from a portable terminal 2 and object identification information (for example, Pn) that identifies a work object (for example, a work object Pn), the communication part 12 selects a worksheet Dn corresponding to the work object Pn indicated by the object identification information from the plurality of worksheets D1 to DN held by the storage part 11 and transmits a work result(s) included in the selected worksheet Dn to the requesting portable terminal 2.

As illustrated in FIG. 4, a portable terminal 2 includes a storage part 21, a speech recognition part 22, a communication part 23, a work instruction part 24, and a reading part 25.

The storage part 21 holds worksheets Dn. In each worksheet Dn, a plurality of items (work items) included in work are associated with respective work results. Herein, for simplicity, the worksheets Dn held by the management server 1 are configured in the same way as the worksheets Dn held by the portable terminal 2. However, the worker IDs and the terminal IDs may be omitted in the worksheets Dn held by the portable terminals 2. The plurality of worksheets Dn (n=1 to N) held by the storage part 21 correspond to the plurality of work objects Pn (n=1 to N, FIG. 3) on a one-to-one basis.

The storage part 21 holds handover source information that identifies a handover source portable terminal or worker. Herein, as an example, the handover source information identifies a handover source portable terminal. FIG. 6 illustrates examples of the handover source information. FIGS. 6(a) to (c) illustrate the handover source information held by the storage parts 21 of the portable terminals 2A to 2C, respectively. Since the worker 100A holding the portable terminal 2A works on the most upstream side (see FIG. 3), no information is set as the handover source terminal ID in the portable terminal 2A (FIG. 6(a)). In contrast, since the worker 100B holding the portable terminal 2B takes over the work left unfinished by the worker 100A, an identifier 2A indicating the portable terminal 2A is set as the handover source terminal ID in the portable terminal 2B (FIG. 6(b)). Likewise, since the worker 100C holding the portable terminal 2C takes over the work left unfinished by the worker 100B, an identifier 2B indicating the portable terminal 2B is set as the handover source terminal ID in the portable terminal 2C (FIG. 6(c)).

The speech recognition part 22 stores a work result(s) obtained by recognizing an utterance(s) of a worker in the storage part 21. For example, when a worker has worked on the work item "check for loose screws on apparatus (check)" about a work object Pn and makes an utterance (for example, an utterance "checked"), the speech recognition part 22 obtains a work result ("checked") by recognizing the utterance and stores this work result in a corresponding worksheet Dn held by the storage part 21 (for example, see the worksheet Dn in FIG. 7(b)). The speech recognition part 22 also recognizes other utterances of the worker (for example, "change", "reload", etc.).

The communication part 23 holds the worksheets Dn (n=1 to N) received from the management server 1 in the storage part 21. In addition, when the speech recognition part 22 recognizes a predetermined utterance (for example, "reload"), the communication part 23 requests the management server 1 to transmit a work result(s) and stores the work result(s) received from the management server 1 in the storage part 21. In addition, when the speech recognition part 22 recognizes a predetermined utterance (for example, "change") of the worker, the communication part 23 transmits the work result(s) included in the corresponding worksheet on which the worker has been working among the worksheets held by the storage part 21 to the management server 1.

When transmitting a request for a work result(s) to the management server, the communication part 23 may also transmit handover source information and receive a work result(s), which has been transmitted from a portable terminal indicated by the handover source information to the management server, from the management server. For example, the communication part 23 of the portable terminal 2B held by the worker 100B transmits, based on an utterance "reload" of the worker 100B, the handover source terminal ID "2A" indicated by the handover source information (FIG. 6(b)) to the management server 1 and receives the work result(s), which has been transmitted from the portable terminal 2A to the management server 1, from the management server 1. With this configuration, the information amount of the work result(s) downloaded from the management server 1 to the portable terminal 2 can be limited (reduced), and the work can be handed over quickly.

The work instruction part 24 instructs a corresponding worker to work on an item(s) in which a work result(s) has not been registered in the worksheet Dn selected by the worker from the worksheets D1 to DN held by the storage part 21. As illustrated in FIG. 3, for example, when the worker 100B takes over a work object Pn from the upstream worker 100A, the worker 100B may select a worksheet Dn corresponding to this work object Pn from the worksheets D1 to DN (see FIG. 3) displayed as a list of unfinished work on a display of the portable terminal 2B by speech input (or a tap operation). For example, in the case of the worksheet Dn illustrated in FIG. 7(a), the work instruction part 24 performs speech guide on the work content (to be read out) corresponding to the work item "check for loose screws on the apparatus (check)". Likewise, in the case of the worksheet Dn illustrated in FIG. 7(b), the work instruction part 24 performs speech guide on the work content (to be read out) corresponding to the work item "check for abnormality on the appearance of the apparatus (check)".

The reading part 25 reads object identification information (for example, Pn) that identifies a work object Pn. The reading part 25 may use any one of various methods to read the object identification information. For example, the reading part 25 may read a (one or two dimensional) bar code attached to a work object Pn. In addition, the reading part 25 may acquire object identification information of a work object Pn from a tag or an IC chip attached to the work object Pn by using near field radio communication (NFC).

The work instruction part 24 may select a worksheet (for example, Dn) corresponding to the work object (for example, Pn) indicated by the object identification information read by the reading part 25 from the plurality of worksheets D1 to DN held by the storage part 21 and instruct the corresponding worker to work on an item(s) in which a work result(s) has not been registered in the selected worksheet Dn. In this case, for example, the worker 100B does not need to select a worksheet Dn corresponding to the work object Pn from the list of unfinished work illustrated in FIG. 3 by speech input or manually. With this configuration, since the worker can save the effort of selecting a worksheet Dn, the work efficiency can be improved. In addition, selection of erroneous worksheets can be prevented. In addition, with this configuration, for example, even if the production line produces many kinds of products, the workers do not need to select worksheets and can prevent erroneous selection of worksheets.

When requesting the management server to transmit a work result(s) held by the management server, the communication part 23 may transmit object identification information read by the reading part 25 and receive a work result(s) included in a worksheet Dn corresponding to the work object Pn indicated by the object identification information from the management server. For example, based on an utterance "reload" of the worker 100B, the portable terminal 2B held by the worker 100B transmits object identification information read by the reading part 25 from a work object Pn to the management server 1 and receives only the work result(s) included in a worksheet Dn corresponding to the work object Pn indicated by the object identification information from the management server 1. Namely, the portable terminal 2B does not receive the work results included in the worksheets D1 to Dn−1 and the worksheets Dn+1 to DN corresponding to the other work objects. With this configuration, only the work result about the work object Pn is downloaded from the management server 1 to the portable terminal 2, and the work can be handed over quickly.

[Operation]

Next, an operation of the work handover support system according to the present exemplary embodiment will be described.

Operation Example 1

Figure 8:
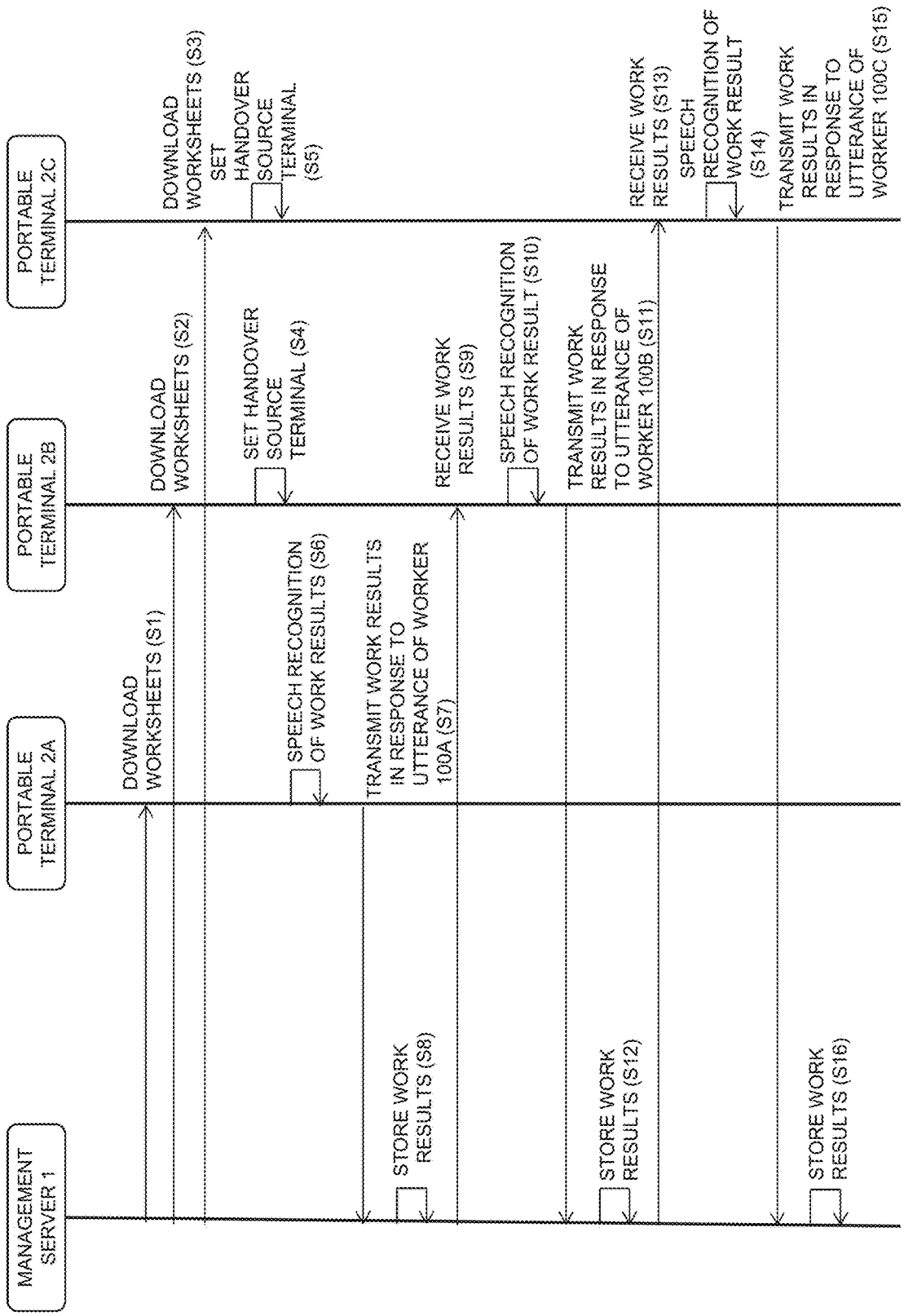
FIG. 8 is a sequence diagram illustrating an operation example in operation example 1 in the work handover support system according to the first exemplary embodiment.

FIG. 8 is a sequence diagram illustrating an operation example of the work handover support system according to the present exemplary embodiment. The following description will be made on an example in which the portable terminals 2A to 2C held by the three workers 100A to 100C illustrated in FIG. 3 acquire the worksheets D1 to DN corresponding to the work objects P1 to PN from the management server 1 and the workers 100A to 100C share the work for producing the work objects Pn while sequentially handing over the work among the workers 100A to 100C in this order.

In FIG. 8, each of the communication parts 23 of the portable terminals 2A to 2C downloads the worksheets D1 to DN illustrated in FIG. 5 from the management server 1 and stores the worksheets D1 to DN in the corresponding storage part 21 (steps S1 to S3). In the worksheets Dn (n=1 to N) held by the portable terminals 2A to 2C, the columns "worker IDs" and "terminal IDs" may be omitted (the same applies to the following).

When the worker 100B sets the portable terminal 2A held by the worker 100A as its handover source terminal ID, the storage part 21 of the portable terminal 2B holds the handover source information illustrated in FIG. 6(*b*) (step S4). Likewise, when the worker 100C sets the portable terminal 2B held by the worker 100B as its handover source terminal ID, the storage part 21 of the portable terminal 2C holds the handover source information illustrated in FIG. 6(*c*) (step S5).

The worker 100A reads object identification information of a work object Pn by using the reading part 25 of the portable terminal 2A. The work instruction part 24 of the portable terminal 2A selects a worksheet Dn corresponding to the work object Pn indicated by the object identification information from the worksheets D1 to DN held by the storage part 21. At this point, as illustrated in FIG. 5, since none of the work items included in the worksheet Dn have been finished, the work instruction part 24 starts speech guide on the first work item, namely, utters "check the model number of the apparatus". When the worker 100A has checked the model number of the apparatus and has uttered "ABC1", the speech recognition part 22 of the portable terminal 2A recognizes the utterance of the worker 100A and stores a work result "ABC1" obtained by recognizing the utterance as the work result of the corresponding work item in the worksheet Dn held by the storage part 21. Next, the work instruction part 24 of the portable terminal 2A performs speech guide on the second work item "attach screws at four places on the upper surface of the apparatus". When the worker 100A has attached the screws and has uttered "attached", the speech recognition part 22 of the portable terminal 2A recognizes the utterance of the worker 100A and stores a work result "attached" obtained by recognizing the utterance as the work result of the corresponding work item in the worksheet Dn held by the storage part 21 (step S6). FIG. 7(*a*) illustrates the worksheet Dn held by the storage part 21 of the portable terminal 2A at this point.

The present case assumes that, when the worker 100A finishes the second work item, the worker 100A judges that the remaining work items need to be handed over to the worker 100B or 100C and utters "change". When the speech recognition part 22 of the portable terminal 2A recognizes the utterance "change" of the worker 100A, the communication part 23 extracts the work results ("ABC1" and "attached" in FIG. 7(*a*)) from the corresponding worksheet Dn held by the storage part 21 and transmits the extracted work results to the management server 1 along with the corresponding worker ID (100A in this case) (step S7).

When the communication part 12 of the management server 1 receives the work results from the portable terminal 2A, the communication part 12 stores the received work results in relevant boxes under the column "work results" in the corresponding worksheet Dn held by the storage part 11 (step S8). In addition, the communication part 12 stores the worker ID (100A in this case) of the worker who has finished the work items corresponding to the work results and the terminal ID (2A in this case) of the terminal that has transmitted the work results in the corresponding worksheet Dn (FIG. 7(*a*)).

As illustrated in FIG. 3, the work object Pn is handed over to the worker 100B. The worker 100B reads the object identification information of the work object Pn by using the reading part 25 of the portable terminal 2B. The worker 100B utters "reload" to acquire the work results obtained by the handover source worker 100A. Accordingly, the communication part 23 of the portable terminal 2B transmits a work result request, the handover source terminal ID (the identification information of the portable terminal 2A) included in the handover source information, and the object identification information of the work object Pn to the management server 1. When the communication part 12 of the management server 1 receives the work result request, the handover source terminal ID, and the object identification information from the portable terminal 2B, the communication part 12 selects, from the worksheets D1 to DN held by the storage part 11, a worksheet Dn corresponding to the work object Pn indicated by the object identification information and transmits the work results ("ABC1" and "attached" in FIG. 7(*a*)) acquired from the portable terminal 2A indicated by the handover source terminal ID among the work results included in the selected worksheet Dn to the portable terminal 2B. The communication part 23 of the portable terminal 2B stores the work results received from the management server 1 in the corresponding worksheet Dn held by the storage part 21 (step S9). FIG. 7(*a*) illustrates the worksheet Dn held by the storage part 21 of the portable terminal 2B at this point.

The work instruction part 24 of the portable terminal 2B selects, from the worksheets D1 to DN held by the storage part 21, a worksheet Dn corresponding to the work object Pn indicated by the object identification information. In this case, as illustrated in FIG. 7(*a*), since the first and second work items included in the worksheet Dn have been finished, the work instruction part 24 starts speech guide on the third work item, namely, utters "check for loose screws at eight places on the apparatus". When the worker 100B has checked for loose screws and has uttered "checked", the speech recognition part 22 of the portable terminal 2B recognizes the utterance of the worker 100B and stores a work result "checked" obtained by recognizing the utterance as the work result of the corresponding work item in the worksheet Dn held by the storage part 21 (step S10). FIG. 7(*b*) illustrates the worksheet Dn held by the storage part 21 of the portable terminal 2B at this point.

However, the present invention described by using the present exemplary embodiment as an example is not limited to the above configuration. It is possible to adopt another configuration in which the worker 100B requests the management server 1 to transmit the work results without reading the object identification information by using the reading part 25. In this case, for example, as described in the first exemplary embodiment, when the communication part 23 of the portable terminal 2B requests the management server 1 to transmit the work results, the communication part 23 may transmit the handover source information and receive the work results, which have been transmitted from the portable terminal indicated by the handover source information to the management server 1, from the management server 1. For example, the communication part 23 of the portable terminal 2B held by the worker 100B may transmit, based on the utterance "reload" of the worker 100B, the handover source terminal ID "2A" indicated by the handover source information (FIG. 6(*b*)) to the management server 1 and receive the work results, which have been transmitted from the portable terminal 2A to the management server 1, from the management server 1.

The present case assumes that the worker 100B works on only the third work item, judges that the remaining work item needs to be handed over to the worker 100C, and utters "change". When the speech recognition part 22 of the portable terminal 2B recognizes the utterance "change" of the worker 100B, the communication part 23 extracts the work results ("ABC1", "attached", "checked" in FIG. 7(*b*)) from the corresponding worksheet Dn held by the storage part 21 and transmits the extracted work results to the management server 1 along with the corresponding worker ID (100B in this case) (step S11).

When the communication part 12 of the management server 1 receives the work results from the portable terminal 2B, the communication part 12 stores the received work results in relevant boxes under the column "work results" in the corresponding worksheet Dn held by the storage part 11 (step S12). In addition, the communication part 12 stores the worker ID (100B in this case) of the worker who has finished the work item corresponding to the work result and the terminal ID (2B in this case) of the terminal that has transmitted the work results in the corresponding worksheet Dn (FIG. 7(*b*)).

As illustrated in FIG. 3, the work object Pn is handed over to the worker 100C. The worker 100C reads the object identification information of the work object Pn by using the reading part 25 of the portable terminal 2C. The worker 100C utters "reload" to acquire the work results transmitted by the handover source worker 100B. Accordingly, the communication part 23 of the portable terminal 2C transmits a work result request, the handover source terminal ID (the identification information of the portable terminal 2B) included in the handover source information, and the object identification information of the work object Pn to the management server 1. When the communication part 12 of the management server 1 receives the work result request, the handover source terminal ID, and the object identification information from the portable terminal 2B, the communication part 12 selects, from the worksheets D1 to DN held by the storage part 11, a worksheet Dn corresponding to the object Pn indicated by the object identification information and transmits the work result ("checked" in FIG. 7(*b*)) acquired from the portable terminal 2B indicated by the handover source terminal ID and the work results acquired before the above work result (for example, the work results "ABC1" and "attached" acquired from the portable terminal 2A in FIG. 7(*b*)) among the work results included in the selected worksheet Dn to the portable terminal 2C. The communication part 23 of the portable terminal 2C stores the work results received from the management server 1 in the corresponding worksheet Dn held by the storage part 21 (step S13). FIG. 7(*b*) illustrates the worksheet Dn held by the storage part 21 of the portable terminal 2C at this point.

The work instruction part 24 of the portable terminal 2C selects, from the worksheets D1 to DN held by the storage part 21, a worksheet Dn corresponding to the work object Pn indicated by the object identification information. In this case, as illustrated in FIG. 7(*b*), since the first to third work items included in the worksheet Dn have been finished, the work instruction part 24 starts speech guide on the fourth work item, namely, utters "check for abnormality on the appearance of the apparatus". When the worker 100C has checked the appearance of the apparatus and has uttered "checked", the speech recognition part 22 of the portable terminal 2C recognizes the utterance of the worker 100C and stores a work result "checked" obtained by recognizing the utterance as the work result of the corresponding work item in the worksheet Dn held by the storage part 21 (step S14). FIG. 7(*c*) illustrates the worksheet Dn held by the storage part 21 of the portable terminal 2C at this point.

When the worker 100C finishes the fourth work item, all the work items included in the work are finished. The present case assumes that the worker 100C utters "change" (another utterance may be applicable) when all the work items are finished. When the speech recognition part 22 of the portable terminal 2C recognizes the utterance "change" of the worker 100C, the communication part 23 extracts the work results ("ABC1", "attached", "checked", and "checked" in FIG. 7(*c*)) from the corresponding worksheet Dn held by the storage part 21 and transmits the extracted work results to the management server 1 along with the worker ID (100C in this case) (step S15).

However, the present invention described by using the present exemplary embodiment as an example is not limited to the above configuration. When the work instruction part 24 determines that all the work items included in the worksheet Dn have been finished (namely, the work items have been completed), the communication part 23 may extract the work results from the worksheet Dn held by the storage part 21 and transmit the work results to the management server 1 along with the worker ID.

When the communication part 12 of the management server 1 receives the work results from the portable terminal 2C, the communication part 12 stores the work results in relevant boxes under the column "work results" in the corresponding worksheet Dn held by the storage part 11 (step S16). In addition, the communication part 12 stores the worker ID (100C in this case) of the worker who has finished the work item corresponding to the work result and the terminal ID (2C in this case) of the terminal that has transmitted the work results in the corresponding worksheet Dn (FIG. 7(*c*)).

Operation Example 2

Next, a second operation example will be described. In the present operation example, the worker 100C illustrated in FIG. 3 can take over work from any one of the upstream workers 100A and 100B.

FIGS. 9(*a*) to (*c*) illustrate handover source information held by the storage parts 21 of the portable terminals 2A to 2C in this operation example. As illustrated in FIGS. 9(*a*) and (*b*), the handover source terminal IDs of the portable terminals 2A and 2B are the same as those in the first operation example (FIGS. 6(*a*) and (*b*)). However, in the present operation example, since the worker 100C holding the portable terminal 2C can take over work from any one of the workers 100A and 100B, the identifiers 2A and 2B of the portable terminals 2A and 2B are set as the handover source terminal IDs of the portable terminal 2C (FIG. 9(*c*)).

In the present operation example, too, the worker 100A finishes the first two work items included in a worksheet Dn (FIG. 5) and transmits the work results to the management server 1 (steps S1 to S8 in FIG. 8), as in the first operation example. FIG. 10(*a*) illustrates the worksheet Dn held by the storage part 11 of the management server 1 after step S8.

The following description assumes that the worker 100B in FIG. 3 is temporarily absent or the work object Pn is handed over to the worker 100C without the worker 100B working on the work object Pn. In this case, the worker 100C reads the object identification information of the work object Pn by using the reading part 25 of the portable terminal 2C. The worker 100C utters "reload" to acquire the work results obtained by the handover source worker 100A. Accordingly, the communication part 23 of the portable terminal 2C transmits a work result request, the handover source terminal IDs (the identification information of the portable terminals 2A and 2B) included in the handover source information (FIG. 9(*c*)), and the object identification information of the work object Pn to the management server 1. When the communication part 12 of the management server 1 receives the work result request, the handover source terminal IDs, and the object identification information from the portable terminal 2C, the communication part 12 selects, from the worksheets D1 to DN held by the storage part 11, a worksheet Dn corresponding to the work object Pn indicated by the object identification information and transmits the work results ("ABC1" and "attached" in FIG. 10(*a*)) acquired from the portable terminal 2A or 2B indicated by the handover source terminal IDs among the work results included in the selected worksheet Dn to the portable terminal 2C. The communication part 23 of the portable terminal 2C stores the work results received from the management server 1 in the corresponding worksheet Dn held by the storage part 21 (step S13). FIG. 10(*a*) illustrates the worksheet Dn held by the storage part 21 of the portable terminal 2C at this point.

The work instruction part 24 of the portable terminal 2C selects, from the worksheets D1 to DN held by the storage part 21, a worksheet Dn corresponding to the work object Pn indicated by the object identification information. In this case, as illustrated in FIG. 10(*a*), since the first and second work items included in the worksheet Dn have been finished, the work instruction part 24 starts speech guide on the third work item, namely, utters "check for loose screws at eight places on the apparatus". When the worker 100C has checked for loose screws on the apparatus and has uttered "checked", the speech recognition part 22 of the portable terminal 2C recognizes the utterance of the worker 100C and stores a work result "checked" obtained by recognizing the utterance as the work result of the corresponding work item in the worksheet Dn held by the storage part 21. Next, the work instruction part 24 starts speech guide on the fourth work item, namely, utters "check for abnormality on the appearance of the apparatus". When the worker 100C has checked the appearance of the apparatus and has uttered "checked", the speech recognition part 22 of the portable terminal 2C recognizes the utterance of the worker 100C and stores a work result "checked" obtained by recognizing the utterance as the work result of the corresponding work item in the worksheet Dn held by the storage part 21. FIG. 10(*b*) illustrates the worksheet Dn held by the storage part 21 of the portable terminal 2C at this point.

The subsequent steps in the present operation example are the same as steps S15 and S16 in the first operation example. In the work handover support system according to the present exemplary embodiment, as illustrated in the present operation example, it is possible to hand over work while skipping a worker(s) in a production line.

[Advantageous Effects]

In the work handover support system according to the present exemplary embodiment, a work result(s) corresponding to an item(s) on which a worker has finished is stored in the management server based on an utterance of the worker holding a portable terminal, and the work result(s) stored in the management server is handed over to a portable terminal held by another worker based on an utterance of the worker holding this another portable terminal. Thus, according to the present exemplary embodiment, work including a plurality of items can be handed over in a hands-free manner between a plurality of workers. In addition, according to the present exemplary embodiment, work instructions are given to workers by speech guide, and the work results are inputted by speech input based on speech recognition technology. Thus, according to the present exemplary embodiment, it is possible to give the work instructions, store the work results, and hand over the work in a hands-free manner in a production line in which a plurality of workers are arranged. In addition, it is possible to improve the efficiency, accuracy, safety, etc. of the work and reduce the burden on the workers.

Variation of Exemplary Embodiment 1

According to the first exemplary embodiment, when the speech recognition part 22 recognizes a predetermined utterance (for example, "change") of the corresponding worker, the communication part 23 transmits the work result(s) included in the worksheet on which the worker has been working to the management server 1. In addition, according to the first exemplary embodiment, when the speech recognition part 22 recognizes a predetermined utterance (for example, "reload") of the corresponding worker, the communication part 23 requests the management server 1 to transmit a work result(s) and stores the work result(s) received from the management server 1 in the storage part 21.

However, by adopting the following configuration, these utterances ("change", "reload", etc.) of the workers can be omitted. For example, when the speech recognition part 22 recognizes an utterance of the corresponding worker about a work result of a work item and the communication part 23 stores the work result in the corresponding worksheet Dn, the communication part 23 transmits the work result stored in the worksheet Dn to the management server 1. Alternatively, when the reading part 25 reads a bar code attached to a work object Pn, the communication part 23 requests the management server 1 to transmit a work result(s) and stores the work result(s) received from the management server 1 in the storage part 21. By allowing the workers to know the change of workers and perform the handover of work based on this configuration, the utterances for handing over work between workers can be omitted. If a work result is transmitted from a portable terminal to the management server each time a work item is finished, a communication occurs per work item. However, since the amount of data exchanged in this communication in this case is small, the work efficiency is not affected.

Exemplary Embodiment 2

Next, a work handover support system according to a second exemplary embodiment will be described with reference to drawings. According to the present exemplary embodiment, the management server in the work handover support system according to the first exemplary embodiment is omitted.

[Configuration]

Figure 11:
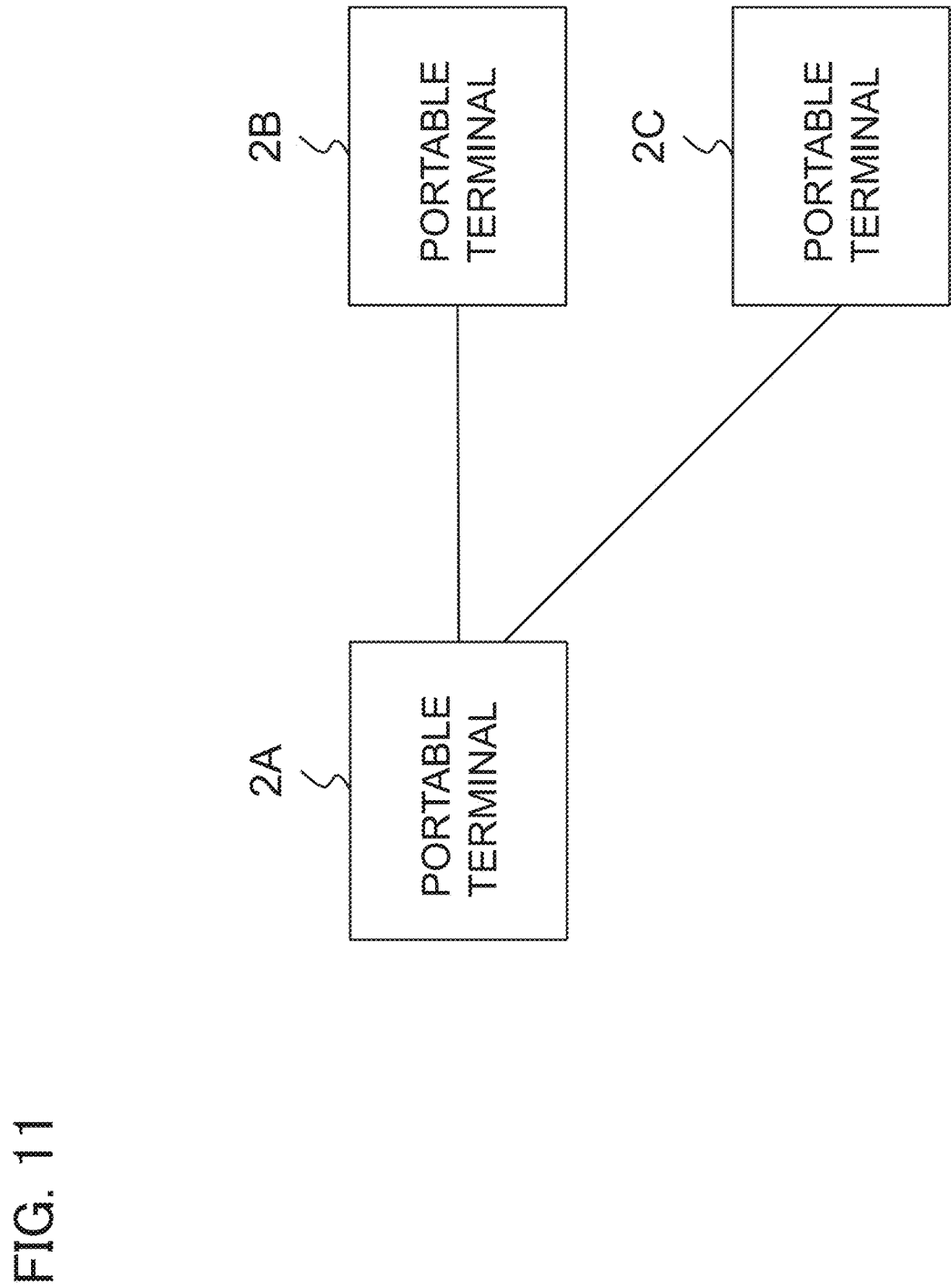
FIG. 11 illustrates a configuration example of a work handover support system according to a second exemplary embodiment.

FIG. 11 illustrates a configuration example of a work handover support system according to the present exemplary embodiment. As illustrated in FIG. 11, in the work handover support system according to the present exemplary embodiment, the management server 1 in the work handover support system (FIG. 1) according to the first exemplary embodiment is omitted, and any one of the portable terminals serves as the management server. The following description assumes, as an example, that the portable terminal 2A held by the worker 100A who works on the most upstream side as illustrated in FIG. 3 serves as the management server 1. Alternatively, either the portable terminal 2B or 2C held by the worker 100B or 100C who works on the downstream side may serve as the management server 1.

Figure 12:
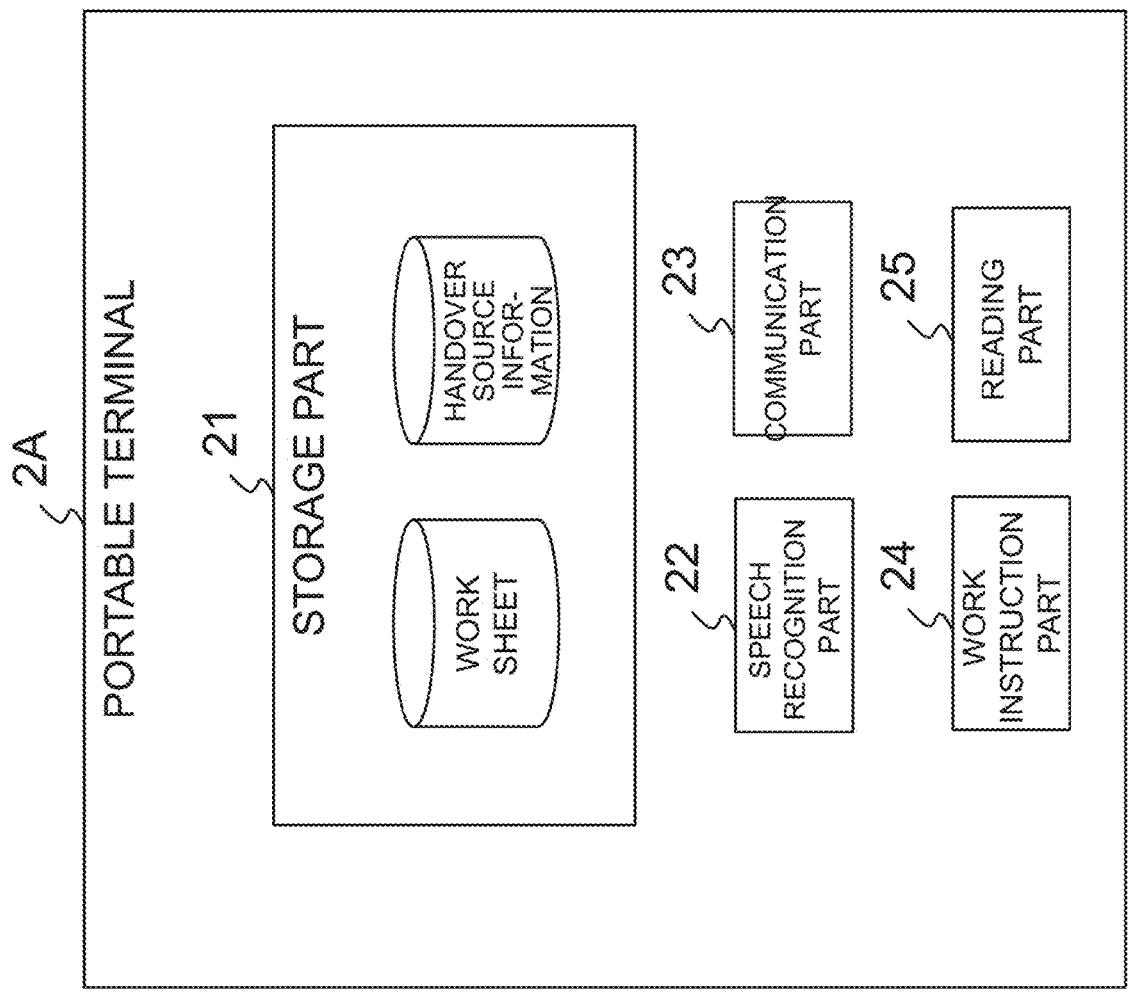
FIG. 12 is a block diagram illustrating a configuration example of a portable terminal serving as a management server in the work handover support system according to the second exemplary embodiment.

FIG. 12 is a block diagram illustrating a configuration example of the portable terminal 2A serving as the management server. As illustrated in FIG. 12, the portable terminal 2A has the configurations of the portable terminal 2 and the management server 1 according to the first exemplary embodiment. According to the present exemplary embodiment, the storage part 21 of the portable terminal 2A serves as the storage part 21 of the portable terminal 2 and the storage part 11 of the management server 1 according to the first exemplary embodiment. In addition, according to the present exemplary embodiment, the communication part 23 of the portable terminal 2A serves as the communication part 23 of the portable terminal 2 and the communication part 12 of the management server 1 according to the first exemplary embodiment.

In contrast, each of the other portable terminals 2B and 2C has the same configuration and function as those of the portable terminal 2 (FIG. 4) according to the first exemplary embodiment. However, the present exemplary embodiment differs from the first exemplary embodiment in that the portable terminals 2B and 2C according to the present exemplary embodiment receive worksheets from the portable terminal 2A and exchange work results with the portable terminal 2A.

[Operation]

Figure 13:
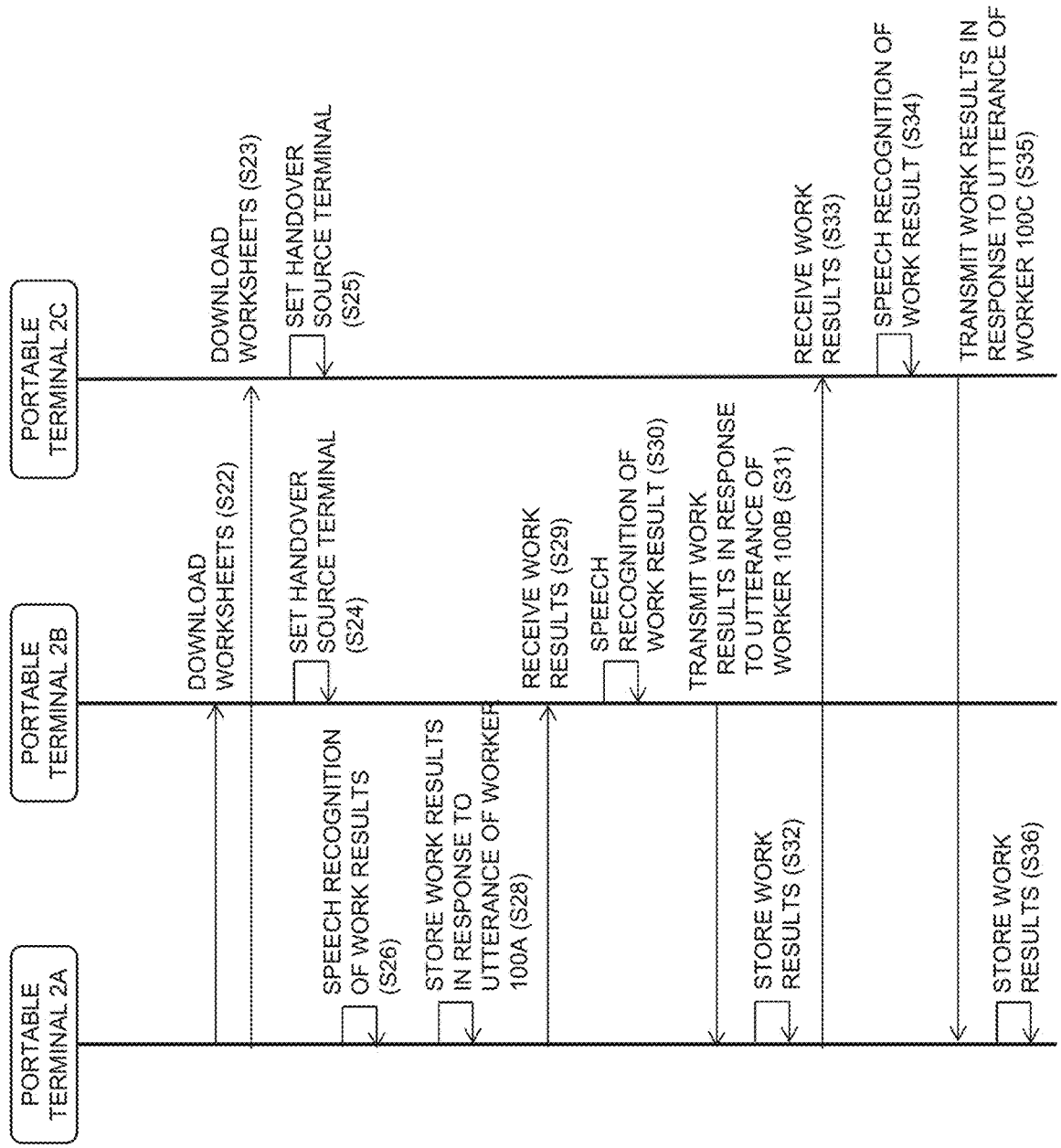
FIG. 13 is a sequence diagram illustrating an operation example of the work handover support system according to the second exemplary embodiment.

FIG. 13 is a sequence diagram illustrating an operation example of the work handover support system according to the present exemplary embodiment. FIG. 13 illustrates an example in which the portable terminals 2B and 2C held by the respective workers 100B and 100C illustrated in FIG. 3 acquire the worksheets D1 to DN of the respective work objects P1 to PN from the portable terminal 2A and the workers 100A to 100C share the work for producing the work objects Pn while handing over the work sequentially among the workers 100A to 100C in this order.

The operation according to the present exemplary embodiment differs from that (FIG. 8) according to the first exemplary embodiment in that it is the portable terminal 2A, not the management server 1, that exchanges the work results with the portable terminals 2B and 2C. The other aspects of the operation according to the present exemplary embodiment are the same as those according to the first exemplary embodiment.

[Advantageous Effects]

The work handover support system according to the present exemplary embodiment provides the same advantageous effects as those provided by the work handover support system according to the first exemplary embodiment. In addition, according to the present exemplary embodiment, the configuration can be simplified by omitting the management server. In addition, since the present exemplary embodiment can be realized as long as the portable terminals 2A to 2C held by the workers 100A to 100C can perform wireless communication with each other, the present exemplary embodiment is applicable to a situation where establishment of a connection environment among the portable terminals and the management server is difficult (for example, a wireless connection environment).

Exemplary Embodiment 3

Next, a work handover support system according to a third exemplary embodiment will be described with reference to drawings.

[Configuration]

FIG. 14 illustrates a configuration example of a work handover support system according to the present exemplary embodiment. As illustrated in FIG. 14, the work handover support system includes the portable terminals 2A to 2C wirelessly connected to each other.

As illustrated as an example in FIG. 3, the present exemplary embodiment assumes that the three workers 100A to 100C share the work items included in the work for producing the work objects Pn (n=1 to N) while handing over the work sequentially among the workers 100A to 100C. Herein, the worker 100A works on the most upstream side, and the downstream worker 100B or 100C takes over the work left unfinished by the worker 100A. In addition, the worker 100C takes over the work from the worker 100B. As illustrated in FIG. 3, the workers 100A to 100C hold the portable terminals 2A to 2C, respectively. The number of workers and the number of portable terminals illustrated in FIGS. 3 and 14 are merely examples, and the present invention is not limited to the illustrated modes.

FIG. 15 is a block diagram illustrating a configuration example of a portable terminal 2 in the work handover support system according to the present exemplary embodiment. The portable terminal 2 in FIG. 15 represents the portable terminals 2A to 2C in FIG. 14.

As illustrated in FIG. 15, the portable terminal 2 includes a storage part 21, a speech recognition part 22, a communication part 23, a work instruction part 24, and a reading part 25. According to the present exemplary embodiment, the storage part 21 holds a plurality of worksheets Dn (n=1 to N) (FIG. 5) corresponding to a plurality of work objects Pn (n=1 to N, FIG. 3) on a one-to-one basis. However, according to the present exemplary embodiment, the worker IDs and the terminal IDs in the worksheets Dn in FIG. 5 may be omitted. The functions of the speech recognition part 22 and the reading part 25 according to the present exemplary embodiment are the same as those of the speech recognition part 22 and the reading part 25 according to the first exemplary embodiment.

According to the present exemplary embodiment, the communication part 23 stores a work result received from another portable terminal in the storage part 21. In addition, when the speech recognition part 22 recognizes a predetermined utterance of the corresponding worker, the communication part 23 transmits a work result(s) held by the storage part 21 to the other portable terminals. For example, when the speech recognition part 22 recognizes a predetermined utterance (for example, "change") of the worker 100A, the communication part 23 of the portable terminal 2A held by the worker 100A transmits a work result(s) included in the corresponding worksheet Dn (FIG. 7(a)) held by the storage part 21 to the other portable terminals 2B and 2C. In this case, each of the communication parts 23 of the portable terminals 2B and 2C stores the work result(s) received from the portable terminal 2A in the corresponding worksheet Dn held by the storage part 21 (for example, FIG. 7(a)).

In addition, according to the present exemplary embodiment, when the reading part 25 reads the object identification information of a work object Pn, the work instruction part 24 selects, from the worksheets D1 to DN held by the storage part 21, a worksheet Dn corresponding to the work object Pn indicated by the object identification information. In addition, the work instruction part 24 starts speech guide on an unfinished work item included in the selected worksheet Dn.

[Operation]

Next, an operation of the work handover support system according to the present exemplary embodiment will be described.

Figure 16:
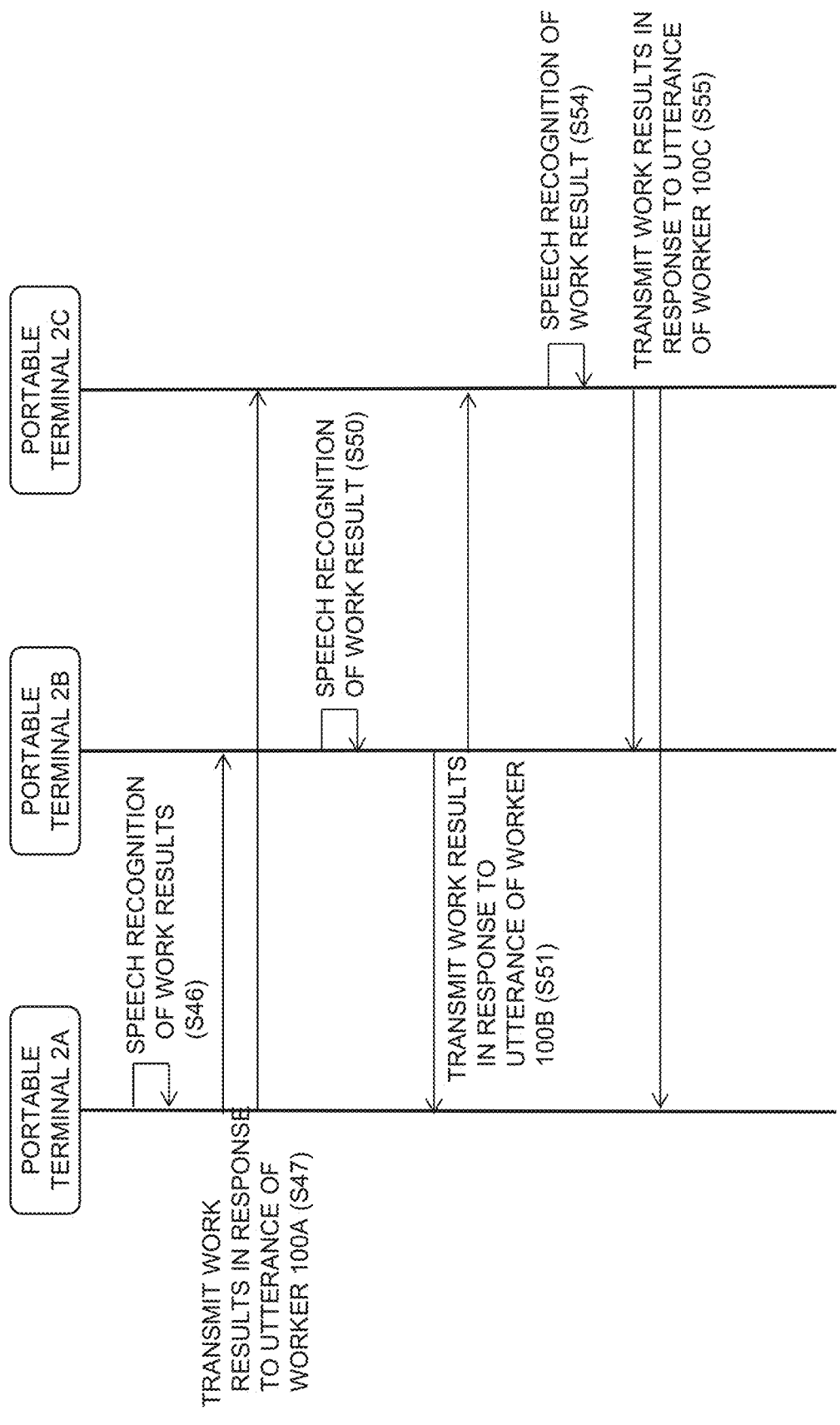
FIG. 16 is a sequence diagram illustrating an operation example of the work handover support system according to the third exemplary embodiment.

FIG. 16 is a sequence diagram illustrating an operation example of the work handover support system according to the present exemplary embodiment. The following description assumes, as an example, that the portable terminals 2A to 2C held by the three workers 100A to 100C illustrated in FIG. 3 previously hold the worksheets D1 to DN of the work objects P1 to PN and the workers 100A to 100C share the work for producing the work objects Pn while handing over the work sequentially among the workers 100A to 100C.

In FIG. 16, each of the storage parts 21 of the portable terminals 2A to 2C previously holds the worksheets D1 to DN illustrated in FIG. 5. According to the present exemplary embodiment, the columns "worker IDs" and "terminal IDs" in the worksheets are not necessary. In addition, according to the present exemplary embodiment, the setting of the handover source terminal IDs can be omitted.

The worker 100A reads the object identification information of a work object Pn by using the reading part 25 of the portable terminal 2A. The work instruction part 24 of the portable terminal 2A selects a worksheet Dn corresponding to the work object Pn indicated by the object identification information from the worksheets D1 to DN held by the storage part 21. At this point, as illustrated in FIG. 5, since none of the work items included in the worksheet Dn have been finished, the work instruction part 24 starts speech guide on the first work item, namely, utters "check the model number of the apparatus". When the worker 100A has checked the model number of the apparatus and has uttered "ABC1", the speech recognition part 22 of the portable terminal 2A recognizes the utterance of the worker 100A and stores a work result "ABC1" obtained by recognizing the utterance as the work result of the corresponding work item in the worksheet Dn held by the storage part 21. Next, the work instruction part 24 of the portable terminal 2A performs speech guide on the second work item "attach screws at four places on the upper surface of the apparatus". When the worker 100A has attached the screws and has uttered "attached", the speech recognition part 22 of the portable terminal 2A recognizes the utterance of the worker 100A and stores a work result "attached" obtained by recognizing the utterance as the work result of the corresponding work item in the worksheet Dn held by the storage part 21 (step S46). FIG. 7(a) illustrates the worksheet Dn held by the storage part 21 of the portable terminal 2A at this point.

The present case assumes that, when the worker 100A finishes the second work item, the worker 100A judges that the remaining work items need to be handed over to the worker 100B or 100C and utters "change". When the speech recognition part 22 of the portable terminal 2A recognizes the utterance "change" of the worker 100A, the communication part 23 extracts the work results ("ABC1" and "attached" in FIG. 7(a)) from the corresponding worksheet Dn held by the storage part 21 and transmits the extracted work results to the portable terminals 2B and 2C (step S47).

When each of the communication parts 12 of the portable terminals 2B and 2C receives the work results from the portable terminal 2A, the corresponding communication part 12 stores the received work results in relevant boxes under the column "work results" in the corresponding worksheet Dn held by the storage part 21. FIG. 7(a) illustrates the worksheet Dn held by the storage part 21 of each of the portable terminals 2B and 2C at this point.

As illustrated in FIG. 3, the work object Pn is handed over to the worker 100B. The worker 100B reads the object identification information of the work object Pn by using the reading part 25 of the portable terminal 2B.

The work instruction part 24 of the portable terminal 2B selects, from the worksheets D1 to DN held by the storage part 21, a worksheet Dn corresponding to the work object Pn indicated by the object identification information. In this case, as illustrated in FIG. 7(a), since the first and second work items included in the worksheet Dn have been finished, the work instruction part 24 starts speech guide on the third work item, namely, utters "check for loose screws at eight places on the apparatus". When the worker 100B has checked for loose screws and has uttered "checked", the speech recognition part 22 of the portable terminal 2B recognizes the utterance of the worker 100B and stores a work result "checked" obtained by recognizing the utterance as the work result of the corresponding work item in the worksheet Dn held by the storage part 21 (step S50). FIG. 7(b) illustrates the worksheet Dn held by the storage part 21 of the portable terminal 2B at this point.

The present case assumes that the worker 100B works on only the third work item, judges that the remaining work items need to be handed over to the worker 100C, and utters "change". When the speech recognition part 22 of the portable terminal 2B recognizes the utterance "change" of the worker 100B, the communication part 23 extracts the work results ("ABC1", "attached", "checked" in FIG. 7(b)) from the corresponding worksheet Dn held by the storage part 21 and transmits the extracted work results to the portable terminals 2A and 2C (step S51). FIG. 7(b) illustrates the worksheet Dn held by the storage parts 21 of the portable terminals 2A and 2C at this point.

As illustrated in FIG. 3, the work object Pn is handed over to the worker 100C. The worker 100C reads the object identification information of the work object Pn by using the reading part 25 of the portable terminal 2C.

The work instruction part 24 of the portable terminal 2C selects, from the worksheets D1 to DN held by the storage part 21, a worksheet Dn corresponding to the work object Pn indicated by the object identification information. In this case, as illustrated in FIG. 7(b), since the first to third work items included in the worksheet Dn have been finished, the work instruction part 24 starts speech guide on the fourth work item, namely, utters "check for abnormality on the appearance of the apparatus". When the worker 100C has checked the appearance of the apparatus and has uttered "checked", the speech recognition part 22 of the portable terminal 2C recognizes the utterance of the worker 100C and stores a work result "checked" obtained by recognizing the utterance as the work result of the corresponding work item in the worksheet Dn held by the storage part 21 (step S54). FIG. 7(c) illustrates the worksheet Dn held by the storage part 21 of the portable terminal 2C at this point.

When the worker 100C finishes the fourth work item, all the work items included in the work are finished. The present case assumes that the worker 100C utters "change" (another utterance may be applicable) when all the work items are finished. When the speech recognition part 22 of the portable terminal 2C recognizes the utterance "change" of the worker 100C, the communication part 23 extracts the work results ("ABC1", "attached", "checked", and "checked" in FIG. 7(c)) from the corresponding worksheet Dn held by the storage part 21 and transmits the extracted work results to the portable terminals 2A and 2B (step S55).

When each of the communication parts 23 of the portable terminals 2A and 2B receives the work results from the portable terminal 2C, the communication part 23 stores the work results in relevant boxes under the column "work results" in the corresponding worksheet Dn held by the storage part 21. FIG. 7(c) illustrates the worksheet Dn held by the storage parts 21 of the portable terminals 2A and 2C at this point.

The above exemplary embodiments have been described by using, as an example, an operation performed when the workers work without stopping the production of the work objects Pn. However, there are cases in which the workers temporarily halt their work in the production of the work objects Pn. For example, the workers could halt their work when they have a break or when a manufacturing defect (for example, an inspection error, defective appearance, etc.) which cannot allow the production of the work objects Pn to continue occurs. The following description assumes that, if a worker temporarily halts working on a work item for a break or the like, the worker makes a predetermined utterance (an utterance indicating a halt to the work on the work item, for example, "halt"). In this case, when the speech recognition part 22 of the portable terminal held by the worker recognizes the utterance "halt" of the worker, the speech recognition part 22 stores a work result "halt" obtained by recognizing the utterance as the work result of the corresponding work item in the worksheet Dn held by the storage part 21. If the worker resumes his/her work from the break, the worker makes a predetermined utterance (an utterance indicating resumption of the work on the work item, for example, "resume"). In this case, when the speech recognition part 22 recognizes the utterance "resume" of the worker, the work instruction part 24 starts speech guide on the halted work item included in the stored work result.

Hereinafter, as an example, an operation performed when a manufacturing defect occurs and a work object Pn is taken out from the production line will be described. The following description assumes that a worker makes a predetermined utterance (an utterance indicating a halt to the work on a work item, for example, "halt"). In this case, when the speech recognition part 22 recognizes the utterance "halt" of the worker, the speech recognition part 22 stores a work result "halt" obtained by recognizing the utterance as the work result of the corresponding work item in the worksheet Dn held by the storage part 21. The following description also assumes that a worker makes a predetermined utterance (an utterance "discontinue" indicating discontinuation of the work). In this case, when the speech recognition part 22 recognizes the utterance "discontinue" of the worker, the communication part 23 transmits the work result(s) included in the corresponding worksheet to the management server 1. Alternatively, for example, the communication part 23 may transmit the work result(s) to the management server 1 based on a tap operation on input means by the worker, instead of speech input.

[Advantageous Effects]

The work handover support system according to the present exemplary embodiment provides the same advantageous effects as those provided by the work handover support systems according to the first and the second exemplary embodiments. In addition, according to the present exemplary embodiment, a work result(s) stored in a certain portable terminal is directly transmitted to the other portable terminals without being transmitted to the management server (or another portable terminal serving as the management server). Thus, according to the present exemplary embodiment, a work result(s) can be handed over to the other portable terminals without a delay. In addition, since the handover destination workers do not need to make an utterance (for example, an utterance "reload") to acquire a work result(s), the handover work is simplified. In addition, according to the present exemplary embodiment, the concentration of load on the portable terminal serving as the management server can be avoided, unlike the second exemplary embodiment. In addition, according to the present exemplary embodiment, since there is no need to set the handover source terminals and the like, the setting work is simplified.

Variation of Exemplary Embodiment 3

According to the third exemplary embodiment, when the speech recognition part 22 recognizes a predetermined utterance (for example, "change") of the corresponding worker, the communication part 23 transmits the work result(s) included in the worksheet on which the worker has been working to the other portable terminals.

However, by adopting the following configuration, the utterance ("change") of the worker can be omitted. For example, when the speech recognition part 22 recognizes an utterance of the corresponding worker about a work result of a work item and the communication part stores the work result in the corresponding worksheet Dn, the communication part 23 transmits the work result(s) stored in the worksheet Dn to the other portable terminals. The handover of the work is performed in the same way as described in the above third exemplary embodiment. Namely, when the reading part 25 reads the object identification information of the work object Pn, the work instruction part 24 selects, from the worksheets D1 to DN held by the storage part 21, a worksheet Dn corresponding to the work object Pn indicated by the object identification information. In addition, the work instruction part 24 starts speech guide on an unfinished work item included in the selected worksheet Dn.

By allowing the workers to know the change of workers and perform the handover of work based on this configuration, the utterances for handing over the work between workers can be omitted. If a work result is transmitted from a portable terminal to the other portable terminals each time a work item is finished, a communication occurs per work item. However, since the amount of data exchanged in this communication in this case is small, the work efficiency is not affected.

Various variations can be made to the work handover support systems according to the above exemplary embodiments. Hereinafter, these variations will be described. However, the variations that can be made to the above exemplary embodiments are not limited to the following examples.

<Variation 1>

In the above exemplary embodiments, the handover source terminal IDs that identify the respective handover source portable terminals are set as the handover source information. However, instead of setting the handover source portable terminals, handover source worker IDs (for example, worker numbers, worker names, etc.) that identify the respective handover source workers may be set. In this case, when the management server receives a request for a work result(s) from a portable terminal of a handover destination worker along with a handover source worker ID, the management server transmits a work result(s), which has been received from a portable terminal held by a worker indicated by the work result handover source worker ID to the portable terminal of the handover destination worker.

<Variation 2>

According to the first and the second exemplary embodiments, a handover destination portable terminal downloads a work result(s) from the management server (or a portable terminal serving as the management server). However, instead of downloading a work result(s), a handover destination portable terminal may be configured to receive other information indicating a work progress status (for example, information indicating until which item included in the corresponding work has been finished) from the management server (or a portable terminal serving as the management server). In addition, instead of exchanging a work result(s), a portable terminal and the management server may exchange a worksheet(s) itself.

<Variation 3>

The above exemplary embodiments have been described by assuming that, for simplicity, the work objects Pn (n=1 to N) are a single kind of work objects and the worksheets Dn (n=1 to N) are also a single kind of worksheets, each worksheet Dn including the same set of work items. However, the above exemplary embodiments can be applied in the same way even when a plurality of kinds of work objects or a plurality of kinds of worksheets are included.

<Variation 4>

The first and the second exemplary embodiments have been described assuming that, when a portable terminal recognizes an utterance (for example, "reload") of a worker, the portable terminal downloads a work result(s) from the management server (or a portable terminal serving as the management server). However, a portable terminal may be configured to access the management server at predetermined timing (for example, in a predetermined period) and download a work result(s), whether a worker makes an utterance or not.

The disclosure of the above PTL is incorporated herein by reference thereto. Variations and adjustments of the exemplary embodiments are possible within the scope of the overall disclosure (including the claims) of the present invention and based on the basic technical concept of the present invention. Various combinations and selections of various disclosed elements (including the elements in the claims, exemplary embodiments, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 1 management server
2, 2A to 2C portable terminal
11 storage part
12 communication part
21 storage part
22 speech recognition part
23 communication part
24 work instruction part
25 reading part
100A to 100C worker
Dn (n=1 to N) worksheet
Pn (n=1 to N) work object

What is claimed is:

1. A portable terminal, comprising:
a storage part which holds work information in which a plurality of items included in work are associated with respective work results;
a speech recognition part which stores a work result(s) obtained by recognizing an utterance(s) related to a work results(s) of a worker in the storage part; and
a communication part which transmits, when the speech recognition part recognizes a predetermined utterance(s) related to a change(s) of a worker, a work result(s) held by the storage part to a management server or another (other) portable terminal(s);
wherein, when the communication part receives a work result(s) from the management server or another (other) portable terminal(s), the communication part stores the received work result(s) in the storage part.

2. The portable terminal according to claim 1;
wherein, when the speech recognition part recognizes a predetermined utterance(s) related to a handover(s) of a worker, the communication part requests the management server to transmit a work result(s) and stores the work result(s) received from the management server in the storage part; and
wherein, when the speech recognition part recognizes a predetermined utterance(s) related to a change(s) of a worker, the communication part transmits a work result(s) held by the storage part to the management server.

3. The portable terminal according to claim 2;
wherein the storage part holds handover source information that identifiers a handover source portable terminal(s) or worker(s) that hands over an unfinished item(s) of the plurality of items included in the work; and
wherein, when the communication part requests the management server to provide a work result(s), the communication part transmits the handover source information and receives a work result(s), which has been transmitted from a portable terminal(s) indicated by the handover source information or from a portable terminal(s) held by a worker(s) indicated by the handover source information to the management server, from the management server.

4. A portable terminal, comprising:
a storage part which holds work information in which a plurality of items included in work are associated with respective work results;
a speech recognition part which stores a work result(s) obtained by recognizing an utterance(s) of a worker in the storage part;
a communication part which transmits, when the speech recognition part recognizes a predetermined utterance(s) of a worker, a work result(s) held by the storage part to a management server or another (other) portable terminal(s); and
a work instruction part which instructs a worker to work on an item(s) in which a work result(s) has not been registered in the work information held by the storage part,
wherein, when the speech recognition part recognizes a predetermined utterance(s) of a worker, the communication part requests the management server to transmit a work result(s) and stores the work result(s) received from the management server in the storage part;
wherein, when the speech recognition part recognizes a predetermined utterance(s) of a worker, the communication part transmits a work result(s) held by the storage part to the management server; and
wherein, when the communication part receives a work result(s) from the management server or another (other) portable terminal(s), the communication part stores the received work result(s) in the storage part.

5. The portable terminal according to claim 4, comprising:
a reading part which reads object identification information that identifies a work object(s);
wherein the storage part holds a plurality of items of work information each corresponding to an individual one of a plurality of work objects; and
wherein the work instruction part selects an item of work information corresponding to a work object indicated by object identification information read by the reading part from the plurality of items of work information held by the storage part and instructs a worker to work on an item(s) in which a work result(s) has not been registered in the selected work information.

6. The portable terminal according to claim 5;
wherein, when the communication part requests the management server to transmit a work result(s) held by the management server, the communication part transmits object identification information read by the reading part and receives a work result(s) included in work information corresponding to a work object indicated by the object identification information from the management server.

7. A work handover support system, comprising:
a plurality of portable terminals each being the portable terminal according to claim 1 or
a plurality of portable terminals each being the portable terminal according to claim 1 and a management server which comprises: a storage part which holds work information in which a plurality of items included in work are associated with respective work results; and a communication part which stores, when the communication part receives a work result(s) transmitted from a portable terminal(s) based on an utterance(s) related to a change(s) of a worker(s) holding the portable terminal(s), the received work result(s) in the storage part and transmits, when the communication part receives a request(s) for a work result(s) from a portable terminal(s), a work result(s) held by the storage part to the requesting portable terminal(s).

8. A management server, comprising:
a storage part which holds work information in which a plurality of items included in work are associated with respective work results; and
a communication part which stores, when the communication part receives a work result(s) transmitted from a portable terminal(s) based on an utterance(s) related to a change(s) of a worker(s) holding the portable terminal(s), the received work result(s) in the storage part and transmits, when the communication part receives a request(s) for a work result(s) from a portable terminal(s) based on an utterance(s) related to a handover(s) of worker(s) holding the portable terminal(s), a work result(s) held by the storage part to the requesting portable terminal(s).

9. The management server according to claim 8;
wherein, when the communication part receives a request(s) for a work result(s) from a portable terminal(s) and handover source information that identifiers a handover source portable terminal(s) or worker(s) that hands over an unfinished item(s) of the plurality of items included in the work, the communication part transmits a work result(s), which has been received from the portable terminal(s) indicated by the received handover source information or from a portable terminal(s) held by the worker(s) indicated by the received handover source information, to the requesting portable terminal(s).

10. The management server according to claim 8;
wherein the storage part holds a plurality of items of work information each corresponding to an individual one of a plurality of work objects; and
wherein, when the communication part receives a request(s) for a work result(s) from a portable terminal(s) and object identification information that identifiers a work object(s), the communication part selects an item of work information corresponding to the work object(s) indicated by the object identification information from the plurality of items of work information held by the storage part and transmits a work result(s) included in the selected work information to the requesting portable terminal(s).

11. A work handover support method, comprising:
storing work information in which a plurality of items included in work are associated with respective work results in a storage part;
storing a work result(s) obtained by recognizing an utterance(s) related to a work result(s) of a worker in the storage part;
transmitting, when a predetermined utterance(s) related to a change(s) of a worker is recognized, a work result(s)

held by the storage part to a management server or another (other) portable terminal(s); and storing, when a work result(s) is received from the management server or another (other) portable terminal(s), the received work result(s) in the storage part.

12. A work handover support method, comprising:

storing work information in which a plurality of items included in work are associated with respective work results in a storage part;

storing, when a work result(s) transmitted from a portable terminal(s) based on an utterance(s) related to a change(s) of a worker(s) holding the portable terminal(s) is received, the received work result(s) in the storage part; and transmitting, when a request(s) for a work result(s) is received from a portable terminal(s), a work result(s) held by the storage part to the requesting portable terminal(s) based on an utterance(s) related to a handover(s) of a worker(s) holding the portable terminal(s).

13. A non-transitory computer-readable recording medium storing thereon a program, causing a computer to perform processing for:

storing work information in which a plurality of items included in work are associated with respective work results in a storage part;

storing a work result(s) obtained by recognizing an utterance(s) related to a work result(s) of a worker in the storage part;

transmitting, when a predetermined utterance(s) related to a change(s) of a worker is recognized, a work result(s) held by the storage part to a management server or another (other) portable terminal(s); and storing, when a work result(s) is received from the management server or another (other) portable terminal(s), the received work result(s) in the storage part.

14. A non-transitory computer-readable recording medium storing thereon a program, causing a computer to perform processing for:

storing work information in which a plurality of items included in work are associated with respective work results in a storage part;

storing, when a work result(s) transmitted from a portable terminal(s) based on an utterance(s) related to a change(s) of a worker(s) holding the portable terminal(s) is received, the received work result(s) in the storage part; and transmitting, when a request(s) for a work result(s) is received from a portable terminal(s), a work result(s) held by the storage part to the requesting portable terminal(s) based on an utterance(s) related to a handover(s) of a worker(s) holding the portable terminals(s).

* * * * *